United States Patent [19]
Nunobiki et al.

[11] Patent Number: 5,848,375
[45] Date of Patent: Dec. 8, 1998

[54] METHOD OF AUTOMATICALLY GENERATING ROAD NETWORK INFORMATION AND SYSTEM FOR EMBODYING THE SAME

[75] Inventors: Tadashi Nunobiki; Tsuneo Yasuda; Kaoru Wakabayashi; Koichi Ito, all of Kanagawaken, Japan

[73] Assignee: Nippon Telegraph and Telephone Corporation, Tokyo, Japan

[21] Appl. No.: 634,743

[22] Filed: Apr. 19, 1996

[30] Foreign Application Priority Data

Apr. 19, 1995 [JP] Japan .................................. 7-093984
Jul. 28, 1995 [JP] Japan .................................. 7-193459

[51] Int. Cl.[6] .................................................. G06G 7/78
[52] U.S. Cl. ....................... 701/212; 701/200; 701/208; 340/995; 340/990; 340/988; 73/178 R
[58] Field of Search ................................... 701/200, 202, 701/210, 211, 212, 208, 207, 209; 340/990, 995, 988, 911; 73/178 R

[56] References Cited

U.S. PATENT DOCUMENTS

| | | | |
|---|---|---|---|
| 3,660,812 | 5/1972 | Inose et al. ............................. | 340/911 |
| 4,633,433 | 12/1986 | Miller .................................... | 340/995 |
| 4,744,033 | 5/1988 | Ogawa et al. .......................... | 701/200 |
| 4,843,569 | 6/1989 | Sawada ................................... | 364/518 |
| 5,206,811 | 4/1993 | Itoh et al. .............................. | 701/211 |
| 5,444,618 | 8/1995 | Seki et al. .............................. | 701/200 |
| 5,502,640 | 3/1996 | Yagyu et al. ........................... | 701/200 |
| 5,613,055 | 3/1997 | Shimoura et al. ...................... | 701/200 |

OTHER PUBLICATIONS

Communications of the ACM, entitled "A Rule–Based", vol. 35, No. 1, dated Jan. 1992, pp. 68–79.
Patent Abstracts of Japan, vol. 940, No. 10, 28 Feb. 1995 & JP–A–06 28977 (Toppan Printing Co. Ltd), 18 Oct. 1994.
Patent Abstracts of Japan, vol. 16, No. 317 (P–1384), 10 Jul. 1992 & JP–A–04 090060 (Toshiba Corp.), 24 Mar. 1992.
Patent Abstracts of Japan, vol. 17, No. 118 (P–1500), 11 Mar. 1993 & JP–A–04 303273 (Toshiba Corp.), 27 Oct. 1992; and.
Patent Abstracts of Japan, vol. 16, No. 421 (P–1414), 4 Sep. 1992 & JP–A–04 141788 (Dainippon Printing Co. Ltd.) 15 May 1992.
Abstracts of GIS—Theory and Applications of GIS, 1994, vol. 2, No. 1, pp. 33–40, entitled "A Method to Generate a Road Network From Road Margins Data".
Abstracts of Generating a Road–Network from Map Data with Vector Representation, EIC Spring National Meeting, D–466 (1994); and.
Abstract of a "Study of Road Network Recognition", National Convention Record, 1987, The Institute of Electronics, Information and Communication Engineers.

*Primary Examiner*—Jacques H. Louis-Jacques
*Attorney, Agent, or Firm*—Banner & Witcoff Ltd.

[57] ABSTRACT

Center lines, i.e., precise road network information may be extracted relative to road margin information in a large-scale map based on teaching road network information (first configuration). Then, center lines, i.e., detailed road network information may be extracted relative to narrow road margin segments whose respective road plane sides have not defined yet, on the basis of road margin segments whose respective road plane sides have already been defined (second configuration). Then, finished road network information may be extracted by correcting road network information derived from the second configuration (third configuration).

44 Claims, 33 Drawing Sheets

SMALL-SCALE ROAD NETWORK : a

LARGE-SCALE ROAD MARGIN SEGMENT FIGURE : b

ONE ROAD SEGMENT Ti
IN TEACHING NETWORK

EXTRACTED CENTER LINE CADIDATES

SELECT AS A CENTER LINE ONE CANDIDATE WHICH IS NEAR TEACHING SEGMENT $t_i$ AND HAS LENGTH AND ROAD WIDTH SIMILAR TO THOSE OF THE TEACHING SEGMENT $t_i$

EXTRACTION OF CENTER LINE

METHOD OF AUTOMATICALLY GENERATING ROAD NETWORK INFORMATION AND SYSTEM FOR EMBODYING THE SAME

BACKGROUND OF THE INVENTION

1. Field of the Invention

The present invention relates to a method of generating automatically road network information and a system for embodying the same and, more particularly, a method of automatically generating road network information capable of finally attaining precise, detailed, and finished road network information based on road margin figures included in a large-scale map by employing road network information included in a small-scale map as previously provided information (referred to as "teaching information" hereinafter) and a system for embodying the same.

2. Description of the Related Art

A map depicted on a reduced scale of about 1/500 to 1/10000 (referred to as a "large-scale map" hereinafter: i.e., a map having relatively small N if the reduced scale is 1/N) is such a detailed map that each road can be expressed by two lines representing block lines (referred to as "road margin figure" hereinafter). In the event that the large-scale map is displayed on the display device to utilize map information included therein in the computer processing, an area between the two lines can be recognized as the road with human eyes.

FIG. 36 shows an example wherein only road data included in the large-scale map on a reduced scale of 1/2500 are depicted. As shown in FIG. 36, the large-scale map contains a large amount of legible information such as detailed road profiles and buildings around the crossings.

However, in case such large amount of information are to be utilized by the computer to a high degree, to represent connection relations between respective roads by graphic structures, i.e., a networking of the roads, is important. On the contrary, if the road network information would be constructed relative to the large-scale map in an opposite way, a detailed and precise road network map including a great amount of information content such as objectives can be achieved, so that it is of extremely high utility value. At that time, if the networking of the roads is conducted manually on the large-scale map, enormous man-hours are needed because the large-scale map has been depicted in detail.

In the meanwhile, in various maps depicted on a reduced scale of about 1/25000 to 1/50000 (referred to as a "small-scale map" hereinafter: i.e., a map having relatively large N if the reduced scale is 1/N), there is included a road network map which is used in car navigation or the like. In FIG. 37, an example of the road network map is illustrated. A guidance map showing path guidance and routes can be derived from the map shown in FIG. 37. Road attributes such as road name, regulation speed, one way, toll road, driveway, national road, prefectural road, city road, private road, etc. have been input as supplementary information of the road network.

However, since road network information included in such small-scale map are always input from the paper map on the reduced scale of 1/25000 to 1/50000 as the original drawing, they are not so good in precision. Therefore, precise road widths, etc. cannot be known. Further, few objectives such as buildings are depicted. For this reason, detailed profiles and information around the crossings, solid crossings, entrance ways, etc. where the user of the map is most likely to mistake the road are not so truly depicted in such small-scale map.

In the case that position measurement or correction would be effected base on road network information in a differential GPS (Global Positioning System) etc., road network information provided from the small-scale map on the reduced scale of 1/25000 lack precision. Therefore, a map which includes higher-definition road network information would be expected.

However, since it has been input originally on the basis of the small-scale map (e.g., map on the reduced scale of 1/25000), information such as the road width cannot be picked up. Therefore, it is difficult to prepare the large-scale map which can include high-precision road network information to provide more detailed road widths.

If the small-scale map and the large-scale map are superposed simply by virtue of coordinate transformation, for example, tremendous discrepancies are caused between them because the following technique has been employed. For this reason, the map available in a practical level cannot be prepared. In other words, since usually the small-scale map makes much account of easy observation, deformed profiles which are different from actual positional profiles (to be called "true profiles" hereinafter) are input by the operator. For purposes of example, in the event that two roads run in parallel, such two roads overlap with each other to thus result in one road if they are depicted as the true profile. In order to prevent this overlapping, a technique for shifting respective positions of two roads on the map from their actual positions to show two roads on the map has been adopted.

FIG. 38 shows an example wherein the small-scale map shown in FIG. 37 and the large-scale map shown in FIG. 36 are converted on the same coordinate system. As shown in FIG. 38, it can be seen that a great discrepancy may be caused between road network information p and road margin segment q, as shown in the area s, only if they are simply superposed.

In case a road network is constructed in the large-scale map database, it entails the greatest cost to digitize road network information, i.e., to input center lines of the roads and road widths. As the conventional technique for automatically detecting center lines of the roads and road widths, the followings have been disclosed.

1) Droney's triangular net method wherein a networking of the roads may be implemented by covering road margin segments by virtue of Droney's triangular nets. This method is employed in the map which has information structures wherein road figures are represented by closed figures and has the reduced scale of 1/10000. More particularly, the method has been recited in a literature, H. Yomono: "A Method to Generate a Network from Road Margin Data", Theory and Application of GIS, 1994, Vol.2, No.1, pp.33–40.

2) Closed loop road recognition method wherein a networking of the roads may be accomplished by representing road figures by virtue of closed loops to recognize road planes. In this method, all road segments are constituted as closed loops. More particularly, the method has been recited in a literature, Tobe, Kanbara, Kawabe: "A study on Road Width Generation Algorithm", General National Convention of the 70th Anniversary of the Founding of IEICE (1987).

3) Parallel line method wherein a road network is generated by virtue of parallelism of the road margins. The method has been recited in a literature, M. Horie, K. Tanaka, N. Babaguchi, S. Dan, T. Kitabashi: "Generating a Road Network from Map Data with Vector Representation", IEICE 1994 Spring National Convention Rec., D-466.

However, road margin figures depicted on the large-scale map have in general the following characteristics.

1. Road figures are mere segment sequences representing block lines:
2. There is no attribute of connection relation, regularity, and road side/building side in road segments:
3. Broad roads and narrow roads are present mixedly:
4. Road figures are disconnected by entrances, railways, etc. and are not represented as closed figures.
5. There are many complicated profiles such as center strips, solid crossings, parallelly running roads.
6. A variety of complicated profiles are present around the crossings.

Therefore, it has been difficult to extract center lines and road widths according to foregoing methods 1) to 3). The aforementioned conventional methods 1) to 3) have drawbacks described below respectively, and therefore they have not reached a practical level in the existing circumstances.

According to the Droney's triangular net method, the method can only respond to the map which has a particular information structure that road figures are represented as the closed figures and has the reduced scale of 1/10000.

According to the closed loop road recognition method, it entails an enormous cost inevitably to represent all road segments as closed loops.

According to the parallel line method, such a serious drawback is caused that block lines being narrower than the road are extracted as the road in error. As a result, center lines and road widths are extracted in a very improper manner.

Consequently, in the prior art, there is no approach for defining center lines and road widths relative to road margin figures in the large-scale map other than the technique for inputting them manually by means of digitizer. In this case, a large staff cost is needed to determine the center lines of the roads and the road widths and thus the number of input items is increased extraordinarily because of detailed map in addition to the large-scale map. For this reason, such a problem has arisen that it is very difficult to achieve the map since an excessively cost is required for manual input of the information.

On the other hand, as described above, the small-scale map usually makes much account of easy observation and therefore the operator may input deformed profiles which are different from actual positional profiles in the map. Thus, a great discrepancy not to be compensated may be caused between the small-scale map and the large-scale map even if both maps are superposed by virtue of coordinate transformation. As a result, it has been difficult to display or manage superposed maps each having a different reduced scale.

SUMMARY OF THE INVENTION

The present invention has been made in light of the above circumstances, and it is an object of the present invention to provide a method of automatically generating road network information capable of finally attaining precise, detailed, and finished road network information based on road margin figures included in a large-scale map, and a system for embodying the same.

It is another object of the present invention to provide a method of automatically generating road network information capable of constructing a map database which includes precise, detailed, and perfect road network information and of considerable utility value, and a system for embodying the same.

It is still another object of the present invention to provide a method of automatically generating road network information capable of attaining precise road network information by employing road network information included in a small-scale map as teaching information, then extracting concerned center lines in road margin information included in a large-scale map, and a system for embodying the same.

It is yet still another object of the present invention to provide a method of automatically generating road network information capable of attaining detailed road network information by extracting center lines from road margin information, even from narrow roads, included in the large-scale map precisely and at high speed, and a system for embodying the same.

It is further object of the present invention to provide a method of automatically generating road network information capable of passing attribute data included in teaching information to precise road network information as it is by correlating teaching information with concerned precise road network information, and a system for embodying the same.

In order to achieve the above objects, according to an aspect of the present invention, there is provided a method of automatically generating road network information, comprising: a 1st step of extracting center lines relative to large-scale road margin information with employing small-scale road network information as teaching information; a 2nd step of extracting center lines relative to road margin information from which center lines have not extracted yet, based on road margin information from which center lines have already been extracted; and a 3rd step of interpolating center lines obtained by up to the 2nd step.

Therefore, precise, detailed, and finished road network information can be obtained by the present invention.

In a preferred embodiment of the present invention, the 1st step comprises, an 11th step of converting the smallscale road network information and the large-scale road network information on a same coordinate system; a 13th step of extracting sequentially center lines from concerned road segments in the large-scale road network information relative to all road segments by selecting road segments from the small-scale road network information one by one; and a 14th step of passing information attached to the road network information as information attached to the center lines.

In a preferred embodiment of the present invention, a 12th step of storing administrative number and attribute information of respective segments constituting the small-scale road network information and the large-scale road network information after the 11th step is further comprised.

Attribute information relating to original road network information on a small-scale map and original large-scale road margin information can be taken over to road network information on a finally obtained large-scale map by this embodiment.

In a preferred embodiment of the present invention, the 13th step comprises, a 131st step of extracting, relative to the selected road segment, all road margin segments which are within a predetermined distance from the selected road segment and has more than predetermined parallelism to the selected road segment, from road margin segments in the road margin information, a 132nd step of extracting intersecting points between horizontal or vertical scanning lines and the all road margin segments extracted in the 131st step, and setting respective middle points between a plurality of extracted intersecting points as road central point candidates, a 133rd step of generating center line candidates by connecting road central point candidates being set in the 132nd step, and a 134th step of selecting a candidate which has most similar length, distance, and road width to those of the selected road segment from the center line candidates generated in the 133rd step, and determining the selected candidate as a center line relative to the selected road segment.

In a preferred embodiment of the present invention, the 2nd step includes, a 21st step of recognizing road plane side relative to road margin information from which a center line is extracted, based on information of the center line, a 22nd step of recognizing road plane side relative to road margin information whose road plane is not defined, based on road margin information whose road plane side is defined in the 21st step, a 23rd step of recognizing paired road margin segments constituting road plane from road margin information of which road plane sides are newly defined in the 22nd step, and a 24th step of extracting a center line based on paired road margin segment defined in the 23rd step.

In a preferred embodiment of the present invention, in the 21st step, road margin information and center line information are received respectively from a road margin information storing means in which all road margin information are stored and a center line information storing means in which center line information are stored, and road margin information in which center lines are extracted are generated by correlating the road margin information with the center line information.

In a preferred embodiment of the present invention, the 22nd step includes, a 221st step of extracting road margin information whose road plane has not defined, and a 222nd step of recognizing road plane side relative to extracted road margin information whose road plane has not defined.

In a preferred embodiment of the present invention, in the 24th step, entire center line information is generated by adding newly generated center line information to already generated center line information.

In a preferred embodiment of the present invention, in the 24th step, the center line is extracted by connecting middle points of extreme points on both ends in overlap portion of paired road margin segments recognized in the 23rd step.

In a preferred embodiment of the present invention, the 3rd step comprises, a 31st step of determining an extreme point of the center line extracted by up to the 2nd step as a dead end, a 32nd step of connecting extreme points of two center lines by segments, a 33rd step of extracting intersecting points of center lines intersected, a 34th step of connecting a center line intersecting with prolonged line of another center line to a prolonged center line, a 35th step of connecting center lines at an intersecting point of prolonged lines of two center lines, and a 36th step of extracting extreme point nodes from all center line information.

According to another aspect of the present invention, there is provided a system for automatically generating road network information, comprising: precise center line information generating means for extracting center lines relative to large-scale road margin information with employing small-scale road network information as teaching information; detailed center line information generating means for extracting center lines relative to road margin information whose center lines have not been extracted, based on road margin information whose center lines have been extracted; and finished center line information generating means for interpolating the center lines extracted by the detailed center line information generating means.

According to still another aspect of the present invention, there is provided a method of automatically generating road network information, comprising: an 11th step of converting the small-scale road network information and the large-scale road network information on a same coordinate system; a 13th step of extracting sequentially center lines from concerned road segments in the large-scale road network information relative to all road segments by selecting road segments from the small-scale road network information one by one; and a 14th step of passing information attached to the road network information as information attached to the center lines.

Precise center lines can be derived relative to a large-scale road margin information while employing a small-scale road network information as teaching information by the present invention.

According to yet still another aspect of the present invention, there is provided a system for automatically generating road network information comprising: coordinate transforming means for transforming the small-scale road network information and the large-scale road margin information to have the same coordinate system, concerned center line extracting means for carrying out such processes relative to all road segments that road segments are selected from the small-scale road network information one by one and then center lines are extracted relative to the large-scale road margin information corresponding to the road segments, and supplementary information succeeding means for succeeding to information affixed to the road network information as information affixed to the center lines.

According to further aspect of the present invention, there is provided a method of automatically generating road network information, comprising: a 21st step of recognizing road plane side relative to road margin information from which a center line is extracted, based on information of the center line, a 22nd step of recognizing road plane side relative to road margin information whose road plane is not defined, based on road margin information whose road plane side is defined in the 21st step, a 23rd step of recognizing paired road margin segments constituting road plane from road margin information of which road plane sides are newly defined in the 22nd step, and a 24th step of extracting a center line based on paired road margin segment defined in the 23rd step.

Detailed road network information can be constructed by the present invention since road plane sides may be recognized relative to, for example, narrow road margin information whose road plane sides have not defined, based on a part of road margin information whose road plane sides have been defined.

According to still further aspect of the present invention, there is provided a system for automatically generating road network information comprising: road plane recognition processing means for recognizing road plane side relative to road margin information from which a center line is extracted, based on information of the center line, unrecognized road margin information road plane recognizing means for recognizing road plane side relative to road margin information whose road plane is not defined, based on road margin information whose road plane side is defined in the road plane recognition processing means, paired road margin segment recognition processing means for recognizing paired road margin segments constituting road plane from road margin information of which road plane sides are newly defined in the unrecognized road margin information road plane recognizing means, and center line extracting means for extracting a center line based on paired road margin segment defined in the paired road margin segment recognition processing means.

The nature, principle and utility of the invention will become more apparent from the following detailed description when read in conjunction with the accompanying drawings.

DESCRIPTION OF THE PREFERRED EMBODIMENTS

Preferred embodiments of the present invention will now be explained in detail with reference to accompanying drawings.

Figure 1:
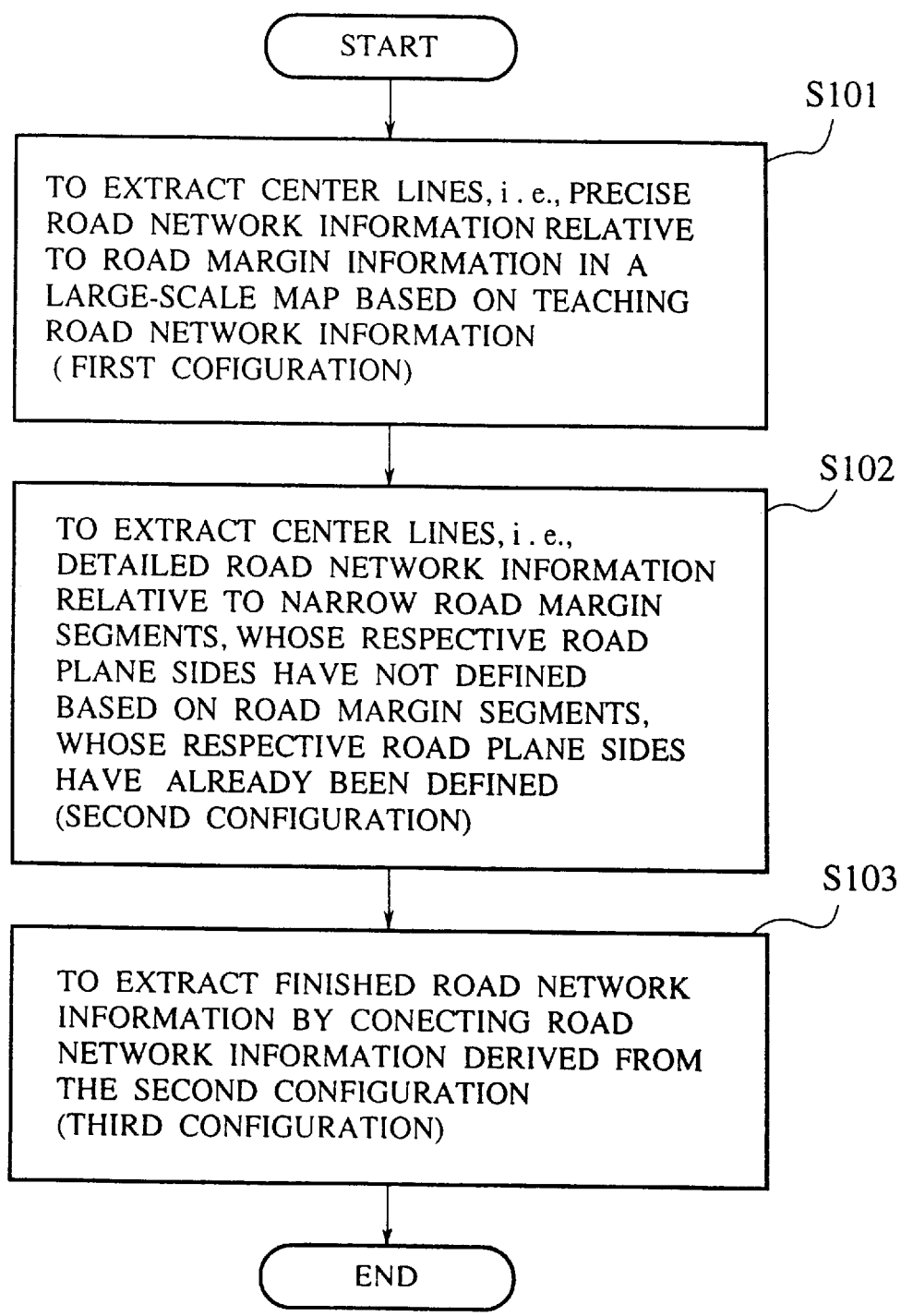
FIG. 1 is a view showing a schematic configuration of a method of automatically generating road network information according to the present invention.

FIG. 1 is a view showing a schematic configuration of a method of automatically generating road network information according to the present invention. As shown in FIG. 1, the present invention is composed of three configurations described below. In other words, as a first configuration, center lines, i.e., precise road network information may be extracted relative to road margin information in the large-scale map on the basis of road network information included in the small-scale road network map (referred to as "teaching road network information" hereinafter) (step 101). However, since road network information included in the small-scale road network map are rough, center lines cannot be extracted up to narrow road margins in road margin information included in the large-scale map. Then, as a second configuration, center lines, i.e., detailed road network information may be extracted relative to narrow road margin segments whose respective road plane sides have not defined yet, on the basis of road margin segments whose center lines have been defined, i.e., whose respective road plane sides have already been defined (step 102). However, road network information derived according to functions of the second configuration are disconnected by the crossings, etc. and are thus incomplete. Then, as a third configuration, finished road network information may be extracted by interpolating or correcting road network information derived from the second configuration (step 103).

Figure 2:
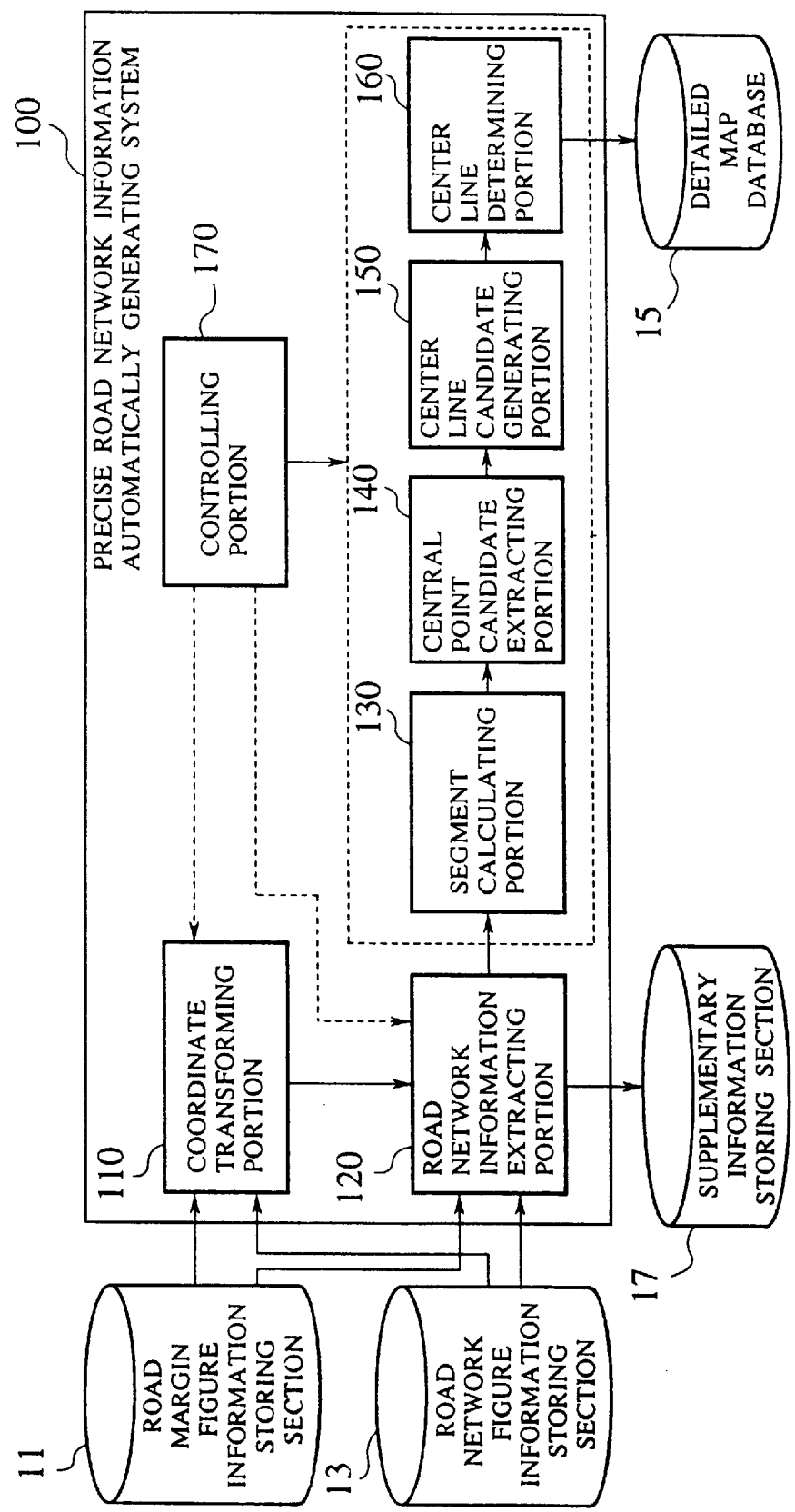
FIG. 2 is a block diagram showing an example of a first configuration of a system for automatically generating road network information according to an embodiment of the present invention.

FIG. 2 is a block diagram showing an example of the first configuration of a system for automatically generating road network information according to an embodiment of the present invention. A method of extracting center lines relative to road margin information included in the large-scale map will be explained hereinbelow with reference to FIG. 2, while employing road network information in the small-scale road network map as teaching information.

Referring to FIG. 2, a precise road network information automatically generating system 100 comprises a coordinate transforming portion 110 for transforming road margin figures supplied from a road margin figure information storing section 11 and road network information supplied from a road network figure information storing section 13 to have the same reduced scale in the same coordinate system and then superposing them mutually; a road network information extracting portion 120 for extracting administrative numbers, inclinations, angles, lengths of all segments from both road margin figures supplied from the road margin figure information storing section 11 and road network information supplied from the road network figure information storing section 13; a segment calculating portion 130 for extracting segment candidates as for road margin figures corresponding to teaching road network information; a central point candidate extracting portion 140 for extracting road central point candidates; a center line candidate generating portion 150 for extracting road center line candidates; a center line determining portion 160 for determining most approximate road center line candidates as center lines; and a controlling portion 170 for controlling respective constituent portions. The controlling portion 170 may control particularly the segment calculating portion 130, the central point candidate extracting portion 140, the center line candidate generating portion 150, and the center line determining portion 160 until all center lines and road widths are obtained.

The road margin figure information storing section 11 is an external storage unit in which the large-scale road margin figures on the reduced scale of 1/500 to 1/10000 are stored.

The road network figure information storing section 13 is an external storage unit in which the small-scale road network maps on the reduced scale of 1/25000 to 1/50000, and road attributes such as road name, regulation speed, one way, toll road, driveway, national road, prefectural road, city road, private road, etc. are stored.

A detailed map database 15 is an external storage unit for storing data generated by the precise road network information automatically generating system 100. In the database 15, the large-scale maps including roads center lines and road widths of which have been extracted are stored, and road attributes such as road name, regulation speed, one way, toll road, driveway, national road, prefectural road, city road, private road, etc. are taken over and stored.

A supplementary information storing section 17 is an external storage unit in which supplementary information such as administrative numbers, inclinations, angles, lengths, etc. of all segments extracted by the road network information extracting portion 120 are stored.

Figure 3:
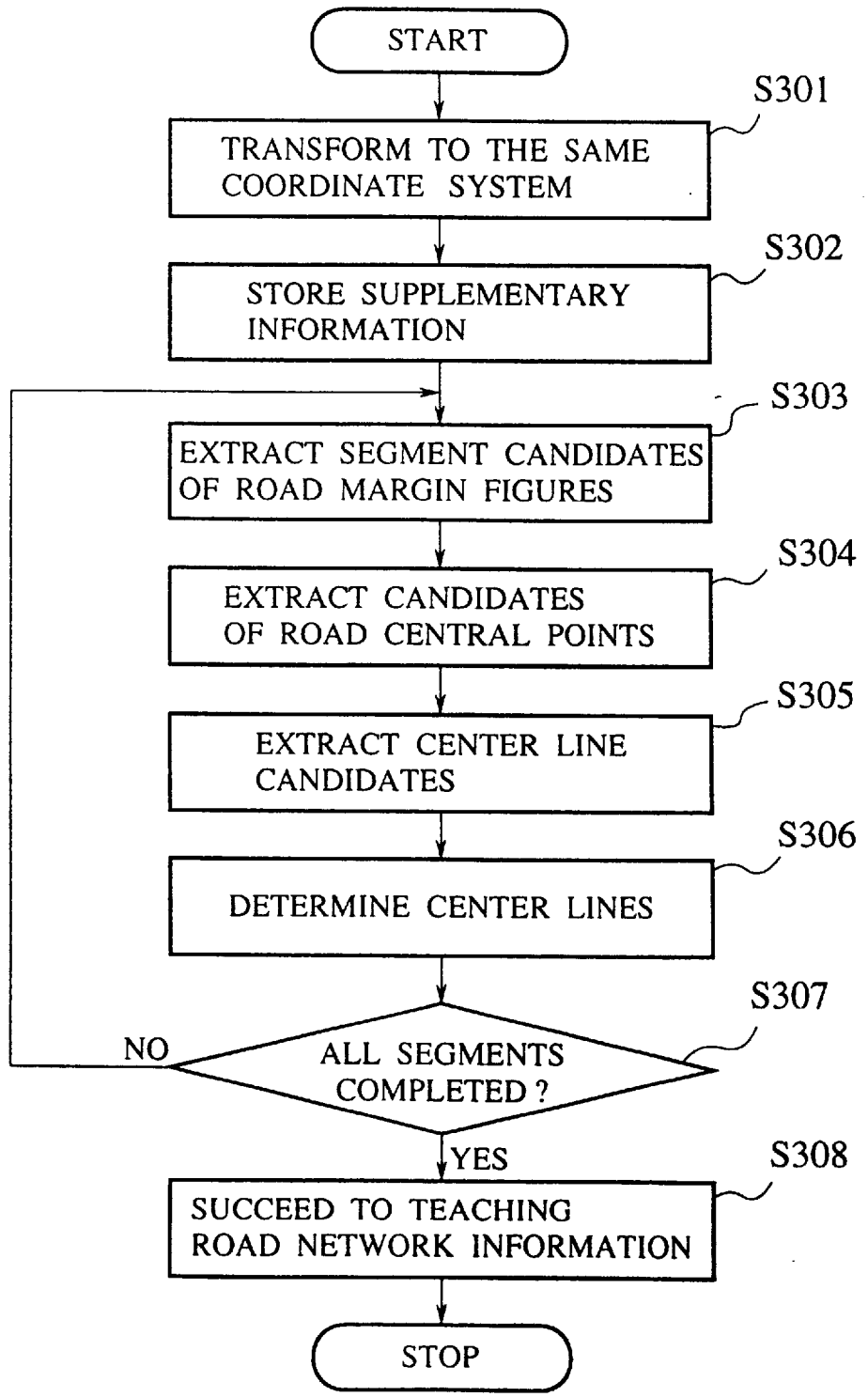
FIG. 3 is a flowchart illustrating an operation of the apparatus for automatically generating road network information in FIG. 2.

FIG. 3 is a flowchart illustrating an operation of the precise road network information automatically generating system 100. The operation will be explained with reference to FIG. 3 hereinbelow.

In step 301, the coordinate transforming portion 110 may receive road margin figures supplied from the road margin figure information storing section 11 and road network information supplied from the road network figure information storing section 13, then transform them to have the same reduced scale in the same coordinate system, and then superpose two maps of road margin figures and road network information mutually. The details will be described later with reference to FIG. 4.

In step 302, the road network information extracting portion 120 may extract administrative numbers, inclinations, angles, lengths of all segments in both road margin figures supplied from the road margin figure information storing section 11 and road network information supplied from the road network figure information storing section 13, and then let the supplementary information storing section 17 store them as supplementary information of respective segments.

In step 303, the segment calculating portion 130 may carry out extraction of all segment candidates as for road margin figures corresponding to teaching road network information obtained in step 301. In other words, all segment being near the road segment $t_i$ and in substantially parallel to the road segment $t_i$ are extracted from segments of road margin figures relative to one road segment $t_i$ constituting teaching road network information. The details will be described later with reference to FIGS. 5A and 5B.

In step 304, the central point candidate extracting portion 140 may extract intersecting points between horizontal or vertical scanning lines and road margin segments relative to all road margin segments which have been derived in step 303, and select respective middle points between plural extracted intersecting points as road central point candidates. The details will be described later with reference to FIG. 6.

In step 305, the center line candidate generating portion 150 may generate road center line candidates by connecting road central point candidates which have been selected in step 304. The details will be described later with reference to FIGS. 7 to 9.

In step 306, the center line determining portion 160 may select candidates having lengths, distances, and road widths most similar to those of the road segment $t_i$ in the teaching road network information from center line candidates obtained in step 305, and then determine selected center line candidates as center lines relative to the road segment $t_i$. The details will be described later with reference to FIGS. 10A and 10B.

In step 307, the controlling portion 170 may determine whether processes for all segments are terminated or not. Unless the processes are terminated, the process returns to step 303. On the contrary, if the processes are terminated, the process advances to step 308.

In step 308, the controlling portion 170 may render precise center lines derived by processes up to step 307 to succeed to information included in concerned teaching road network information.

An operation of the controlling portion 170 will be explained supplementarily. After termination of step 302, the controlling portion 170 may determine, although omitted in the flowchart shown in FIG. 3, whether or not processes have been completed relative to all the segments $t_i$ in road network information. In case there are segments which being not processed, the controlling portion 170 may control the process to return to step 302 again. In addition, after termination of step 303, the controlling portion 170 may determine whether or not corresponding segment candidates have been extracted relative to entire teaching road network information. In case there are teaching road network information which being not extracted, the controlling portion 170 may control the process to return to step 303 again. Further, after completing step 304, the controlling portion 170 may determine whether or not road central point candidates have been extracted relative to all road margin segments derived in step 303. If not, the controlling portion 170 may control the process to return to step 304 again. Furthermore, after completing step 305, the controlling portion 170 may determine whether more than one center line candidates have been extracted or not. Like the above, in the event that determination are carried out on the basis of respective decision conditions at the time of terminating processes in respective steps, corresponding center lines and road widths in road margin figures can be firmly extracted relative to all segments included in teaching road network information.

By assigning administrative numbers attached to road segments in road network information as administrative numbers of concerned center lines, road attribute data of road segments in the road network information such as road name, regulation speed, one way, toll road, driveway, national road, prefectural road, city road, private road, etc. can be taken over to the road margin figures as they are.

Figure 4:
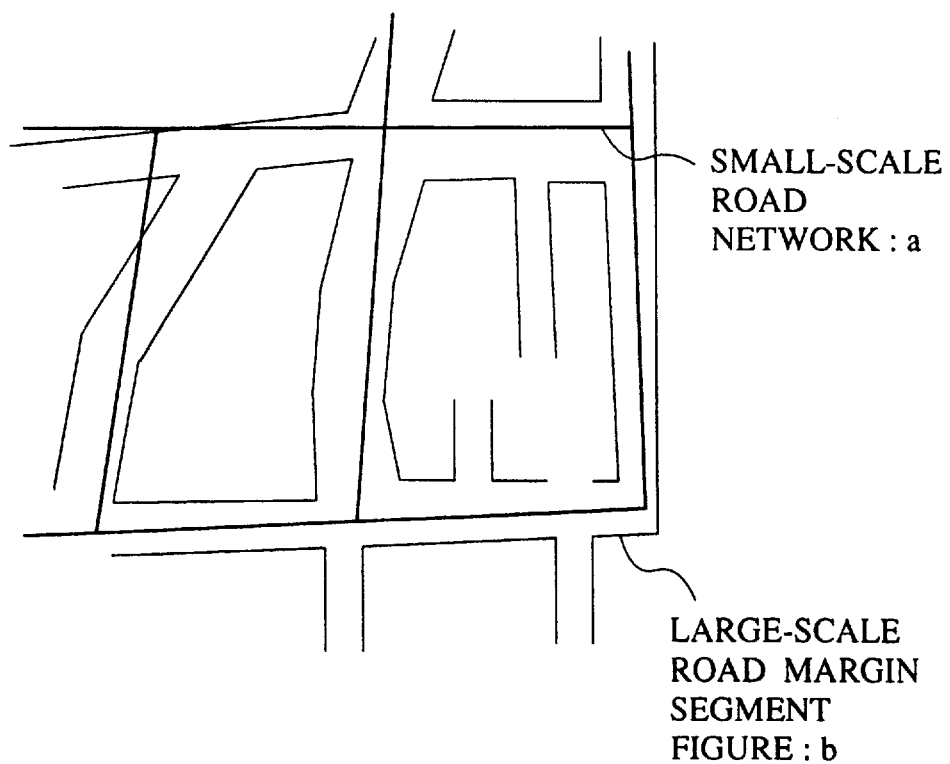
FIG. 4 is a fragmental view illustrating an operation of a coordinate converting portion in FIG. 2.

FIG. 4 is a view illustrating an operation of the coordinate transforming portion 110. As shown in FIG. 4, the coordinate transforming portion 110 may superpose small-scale road network a supplied from the road margin figure information storing section 11 and large-scale road margin segment figures b supplied from the road network figure information storing section 13 on the same coordinate system.

Figure 5A:
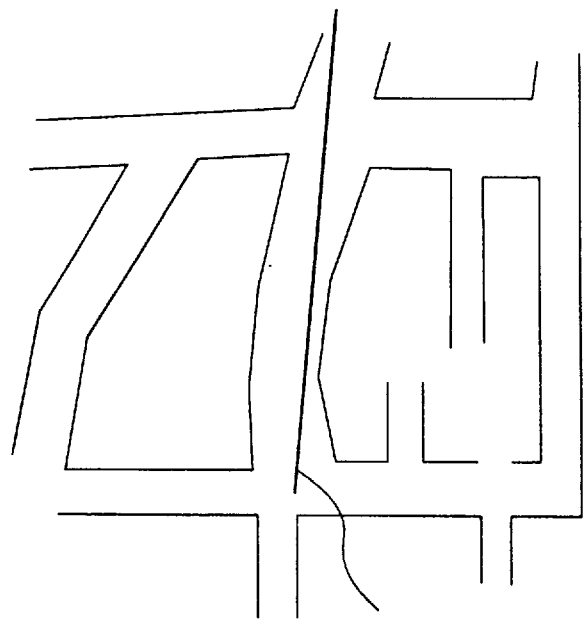
FIGS. 5A and 5B are fragmental views illustrating an operation of a segment calculating portion in FIG. 2.
Figure 5B:
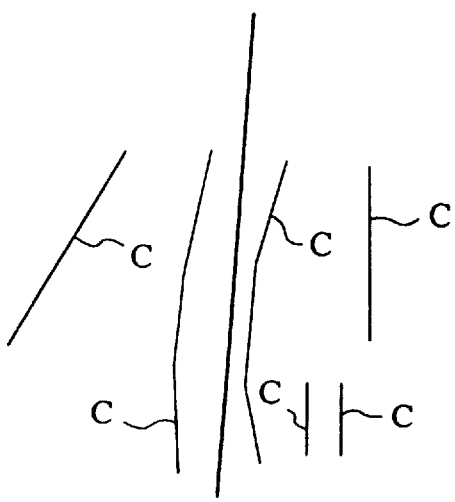

FIGS. 5A and 5B are views illustrating an operation of the segment calculating portion 130. First, as shown in FIG. 5A, the segment calculating portion 130 may select one road segment $t_i$ of teaching road network in two maps superposed on the same coordinate system. At this time, it should be noted that, if selected road segments are less than a predetermined length (for example, 10 m), they may be canceled without condition. Then, as shown in FIG. 5B, all segments included in road margin figures which are within a predetermined distance EL from the selected road segment ti and are within a predetermined angle ET relative to the selected road segment ti are selected, and then set as center line selection objective segments (that is, road margin segments selected to extract center lines). More particularly, if all segments included in road margin figures which are within a predetermined distance EL (for example, 50 m) from the road segment $t_i$ and are within a predetermined angle ET (for example, −45 degree to +45 degree) are selected with respect to the road segment $t_i$ in teaching road network shown in FIG. 5B, the center line selection objective segments c are derived. Moreover, note that such a condition may be imposed that either a perpendicular can reach the selected road segment $t_i$ if it is drawn to the road segment $t_i$ selected from middle points of segments in road margin figures or overlap between the segment of road margin figures and the selected road segment $t_i$ is more than a predetermined length. Furthermore, note that an upper limit of the number of the center line selection objective segments c may be defined in case that considerable number of the center line selection objective segments c will be derived.

Figure 6:
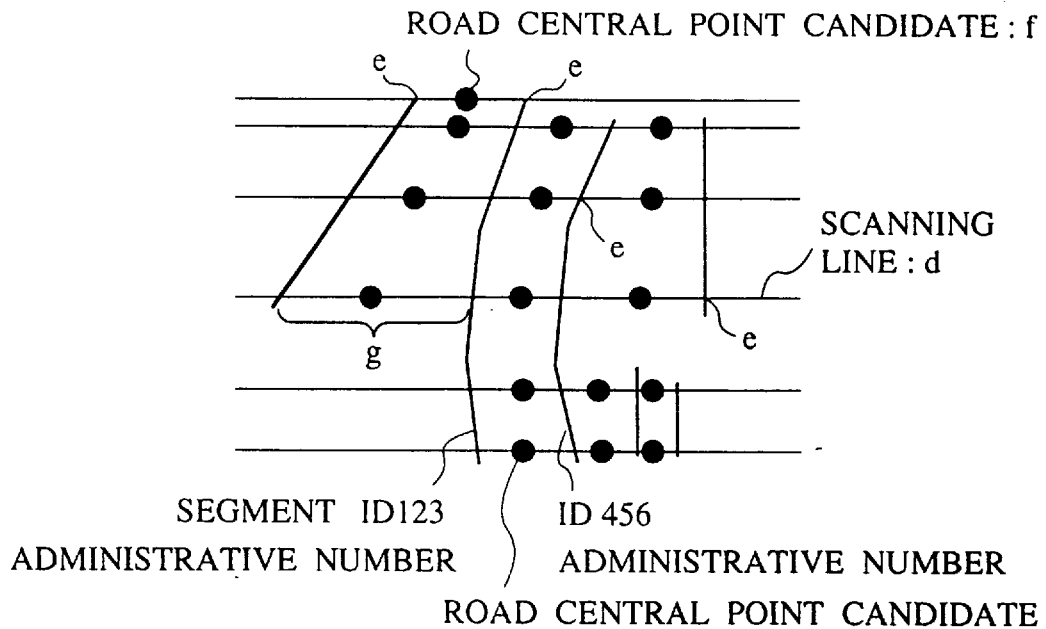
FIG. 6 is a fragmental view illustrating an operation of a central point candidate extracting portion in FIG. 2.

FIG. 6 is a fragmental view illustrating an operation of a central point candidate extracting portion 140. The central point candidate extracting portion 140 may draw horizontal or vertical scanning lines d relative to all center line selection objective segments extracted by the segment calculating portion 130 and detect all intersecting points e between the scanning lines and the center line selection objective segments. In this case, if an angle between the segment $t_i$ of road network information and the X axis is $0° \leq \theta \leq 45°$ or $135° \leq \theta \leq 180°$, then the vertical scanning lines d being parallel to the Y axis are drawn whereas, if the angle is $45° \leq \theta \leq 135°$, then the horizontal scanning lines being parallel to the X axis are drawn. Respective middle points between all detected intersecting points e are then set as road central point candidates f. In FIG. 6, points f indicated by a mark "●" are the road central point candidates. At this time, if the road central point candidates f is located in the inside of closed areas in road margin figures, such road central point candidates f may be deleted from candidates. In FIG. 6, numbers ID124, ID456, etc. are administrative numbers which are affixed to the center line selection objective segments c.

To respective road central point candidates f are affixed administrative numbers, inclinations, angles, lengths of two referred road margin segments, and road widths g of such referred road margin segments, and administrative numbers of segments in concerned teaching road network information. Thereby, if center lines are extracted, it is feasible to hand over attribute information of segments of road network information to the center lines according to the administrative numbers.

Figure 7:
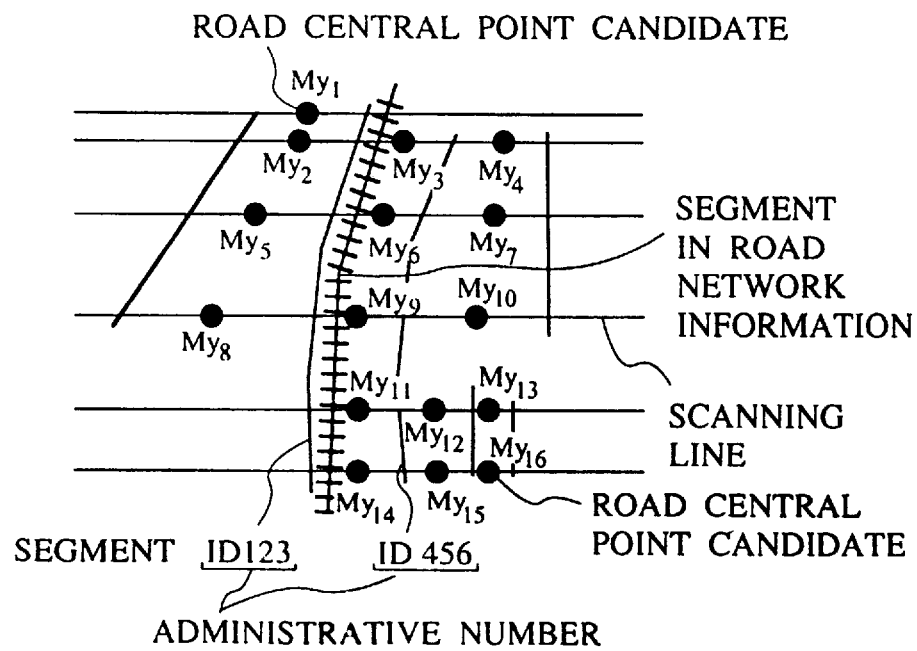
FIG. 7 is a fragmental view illustrating an operation of a center line candidate generating portion in FIG. 2.
Figure 8:
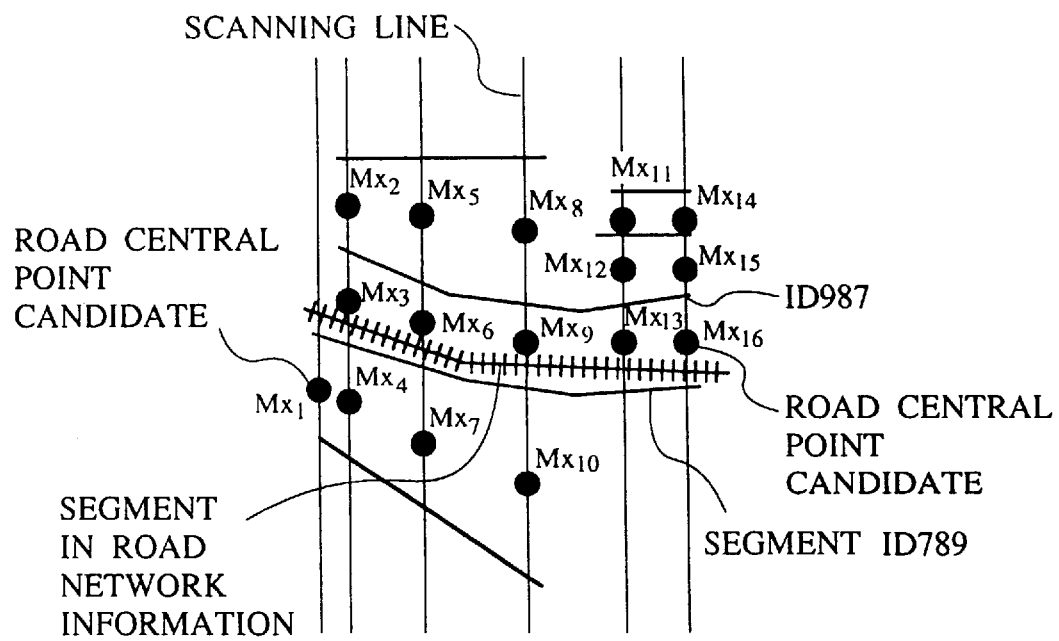
FIG. 8 is a fragmental view illustrating an operation of the center line candidate generating portion in FIG. 2.

FIGS. 7 and 8 are views illustrating an operation of the center line candidate generating portion 150. The center line candidate generating portion 150 may connect the road central point candidates f having the same road margin segments on both sides, which are used to extract the road central point candidates f, to generate center line candidates. But such center line candidates are limited to those satisfying the following conditions. That is, a distance between the road central point candidates f is within a predetermined distance, variation in road widths in excess of a predetermined value is not caused between adjacent road central point candidates f, and a bending angle of each center line is less than a predetermined value.

The center line candidate generating portion 150 may number the road central point candidates f to facilitate retrieval of each road central point candidate f. In other words, the road central point candidates f are numbered in the order of array of scanning lines, and also the road central point candidates f on the same scanning line are sequentially numbered.

For instance, the numbering is shown in FIG. 7 if the scanning lines are drawn in the horizontal direction. In FIG.

7, a road central point candidate to be connected next to the road central point candidate $M_{y1}$ is any of candidates $M_{y2}$, $M_{y3}$, and $M_{y4}$ located on the adjacent scanning line in retrieving sequence, and subsequently a road central point candidate to be connected next is any of candidates $M_{y5}$, $M_{y6}$, and $M_{y7}$. According to such numbering, effective retrieval can be carried out. In other words, candidates are limited like $M_{y1} \rightarrow$(any of $M_{y2}, M_{y3}$ and $M_{y4}$)$\rightarrow$(any of $M_{y5}$, $M_{y6}$, and $M_{y7}$)$\rightarrow$. . . to thus improve retrieval efficiency. If such numbering is not done, retrieval of candidates must be carried out like $M_{y1} \rightarrow$(all remaining $M_y$?)$\rightarrow$(all remaining $M_y$?)$\rightarrow$. . . since candidates to be connected next are not restricted. Therefore, retrieval efficiency is extremely low.

On the other hand, the numbering is shown in FIG. 8 if the scanning lines are drawn in the vertical direction. In FIG. 8, like the case of the horizontal scanning line, a road central point candidate to be connected next to the road central point candidate $M_{y1}$ is any of candidates $M_{y2}$, $M_{y3}$, and $M_{y4}$ located on the adjacent scanning line in retrieving sequence, and further a road central point candidate to be connected next is any of candidates $M_{y5}$, $M_{y6}$, and $M_{y7}$.

According to foregoing numbering process, procedure for connecting the road central point candidates is carried out at high speed.

Figure 9:
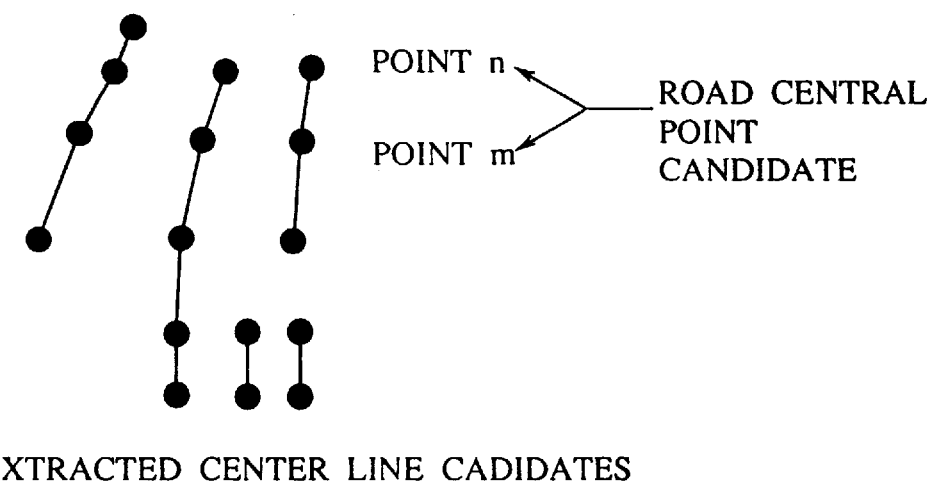
FIG. 9 is a view illustrative of examples of center line candidate which are extracted according to process in the center line candidate generating portion in FIG. 2.

FIG. 9 is a view illustrative of examples of center line candidate which are extracted according to the process in the center line candidate generating portion 150.

Figure 10A:
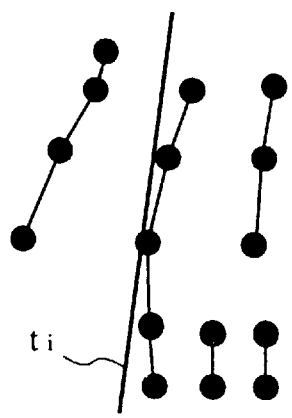
FIGS. 10A and 10B are fragmental views illustrating operations of a center line determining portion in FIG. 2.
Figure 10B:
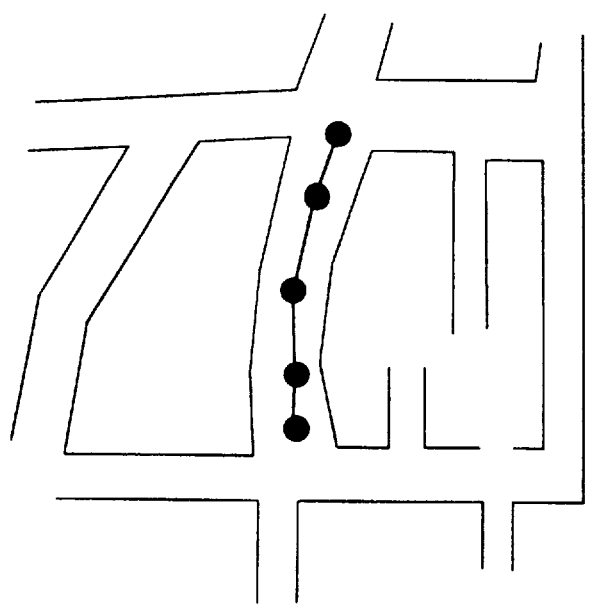

FIGS. 10A and 10B are fragmental views illustrating operations of the center line determining portion 160. The center line determining portion 160 may determine the center line from center line candidates extracted as above. More particularly, such a candidate is selected as the center line that the length is close to that of the road segment $t_i$, the distance away from the road segment $t_i$ is short, and the road width is close to that of the road segment $t_i$. In addition to theses indexes, such process may be applied for example that center lines intersecting with road margins are canceled unconditionally. The enter line shown in FIG. 10B can be extracted from respective center line candidates in FIG. 10A.

Accompanying to the above process, the administrative numbers affixed to the road segments in referred teaching road network information are attached to derived center lines as their administrative numbers. As a result, information affixed to the road segments in referred teaching road network information can be succeeded as they are by resultant center lines. Moreover, information included in road margin figures in the large-scale map can also be succeeded by attaching administrative numbers of two concerned road margin segments on both sides and their attribute information to resultant center lines. For this reason, center lines, i.e., road network including precise and abundant attribute information can be implemented on the large-scale map.

With the above process as the process in step 101 shown in FIG. 1, precise center lines, i.e., precise road network information can be derived from the large-scale road margin figures while employing the small-scale road network information, i.e., rough road network information as teaching information.

Figure 11:
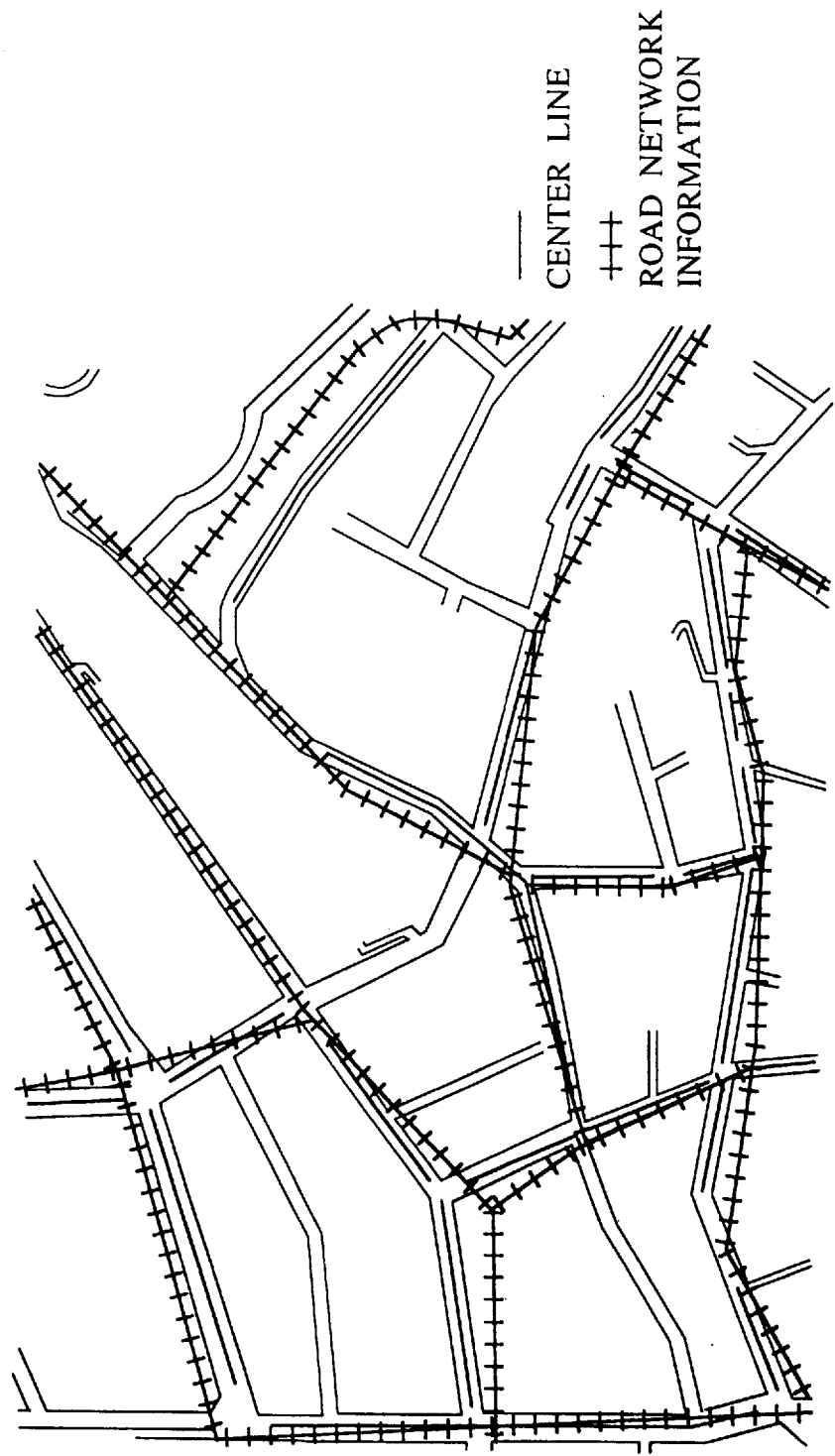
FIG. 11 is a view illustrative of an example of extracted center lines.

FIG. 11 is a view illustrative of a particular example of the center lines extracted according to the above process. As shown in FIG. 11, it would be understood that the center lines can be firmly extracted relative to road margin figures having the corresponding road network. However, in order to extract more detailed and precise center lines, the second and third configurations shown in FIG. 1 have to be employed.

Figure 12:
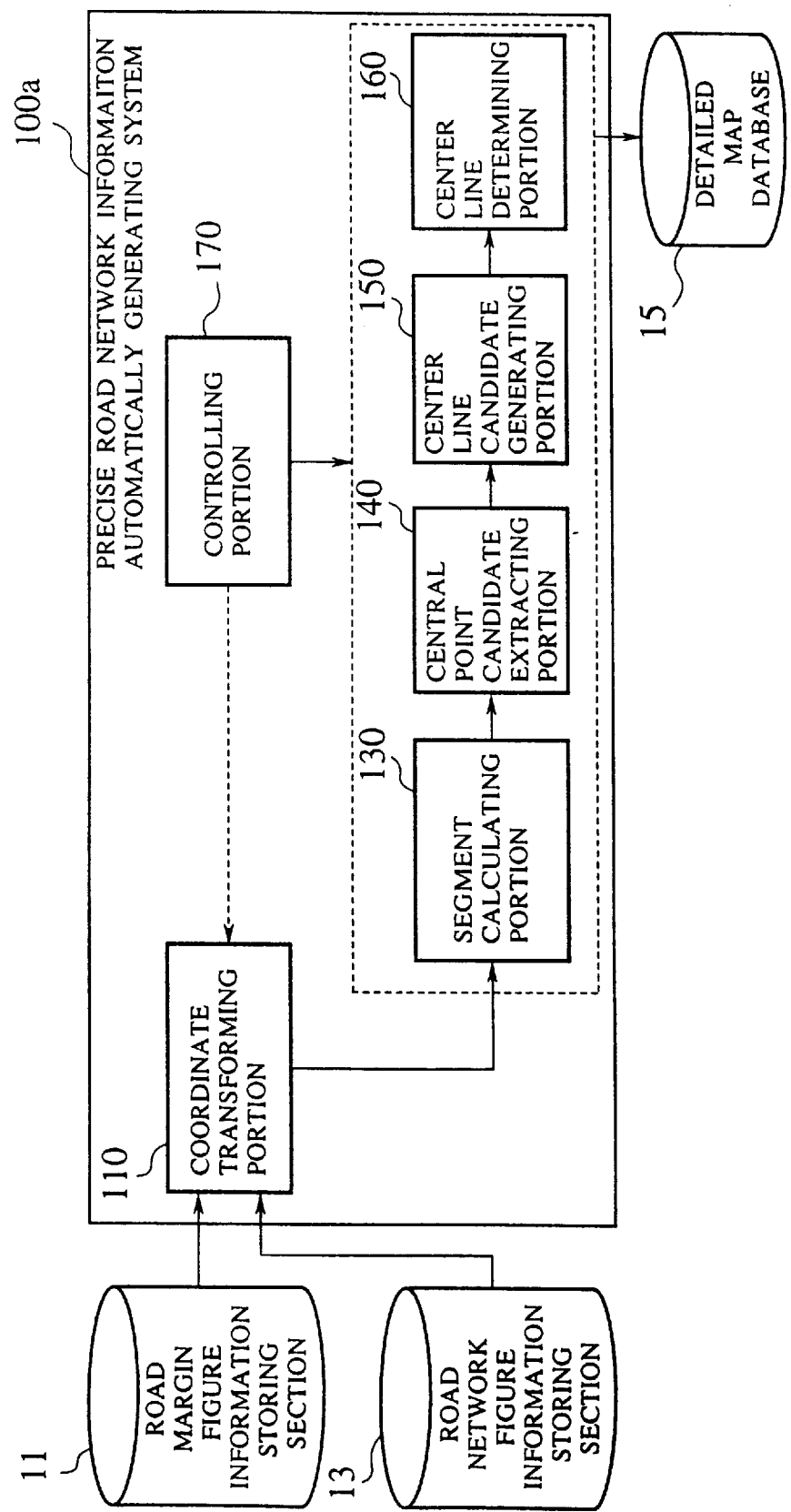
FIG. 12 is a block diagram showing another example of the first configuration of the apparatus for automatically generating road network information according to the embodiment of the present invention.
Figure 13:
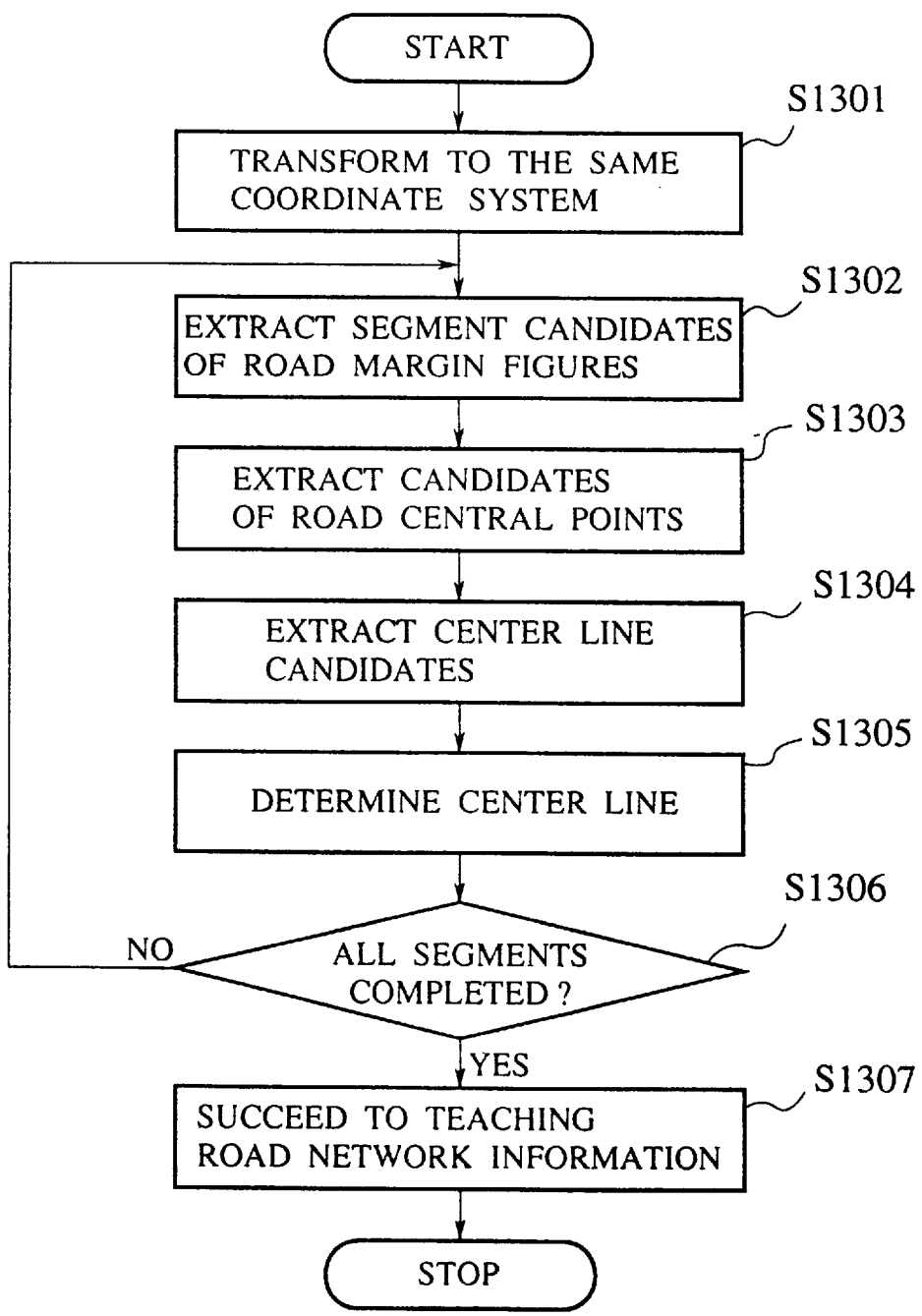
FIG. 13 is a flowchart illustrating an operation of the apparatus for automatically generating road network information shown in FIG. 12.

FIG. 12 is a block diagram showing another example of the first configuration of the apparatus for automatically generating road network information according to the embodiment of the present invention. In this another example, the road network information extracting portion 120 and the supplementary information storing section 17 in FIG. 2 are omitted, and step 302 in the above example is deleted. As a result, operation process procedures are given as shown in FIG. 13. In this event, the same functions as those in the above example can be achieved by calculating administrative numbers, inclinations, angles, and lengths of all segments each time in the process following step 1302. Conversely speaking, like the foregoing example, once such information have been extracted and stored, there is no necessity to extract them each time in the succeeding process.

Next, a second configuration will be explained wherein the center lines, i. e., detailed road network information may be extracted relative to narrow road margin segments whose respective road plane sides have not defined yet, on the basis of road margin segments whose center lines have been defined, i.e., whose respective road plane sides have already been defined.

In process according to the second configuration, road plane sides of road margin segments whose road plane sides are not defined may be extracted according to road margin segments whose road plane sides are defined in road margin figure information, and then center lines are extracted. However, the center lines can be easily extracted if the road plane sides are defined, therefore more detailed process for extracting center line by utilizing the result in the process according to the first configuration will be explained.

Figure 14:
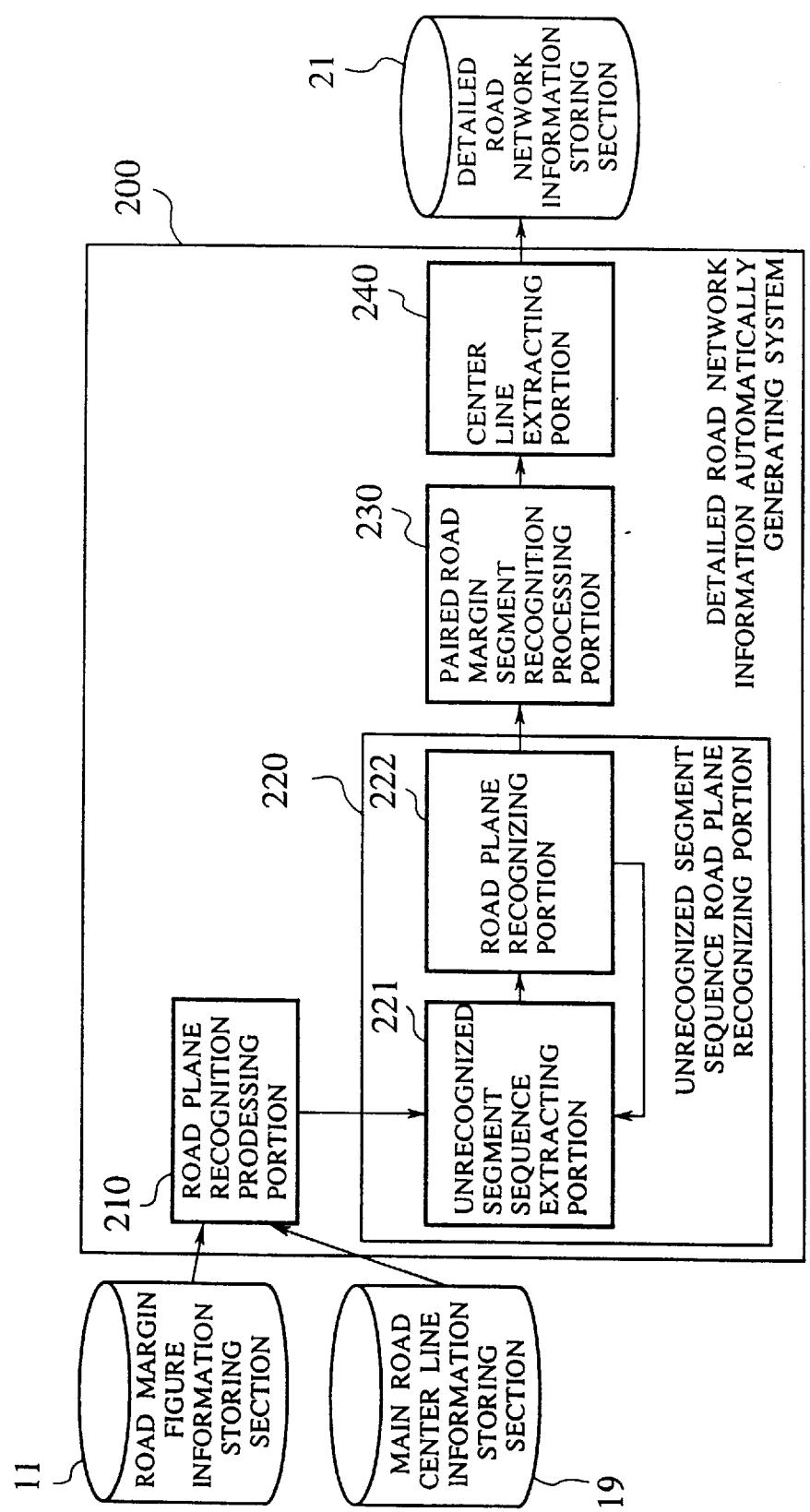
FIG. 14 is a block diagram showing an example of a second configuration of the apparatus for automatically generating road network information according to the embodiment of the present invention.

FIG. 14 is a block diagram showing an example of the second configuration of the apparatus for automatically generating road network information according to the embodiment of the present invention.

A detailed road network information automatically generating system 200 shown in FIG. 14 comprises a road plane recognition processing portion 210 for recognizing road plane sides relative to road margin figures based on center line information; an unrecognized segment sequence road plane recognizing portion 220 for recognizing road plane sides relative to road margin segments whose road plane sides are not defined on the basis of road margin segments whose road plane sides are defined; a paired road margin segment recognition processing portion 230 for extracting paired road margin segments constituting recognized road planes; and a center line extracting portion 240 for extracting center lines based on paired road margin segments whose road plane sides are newly defined.

Figure 36:
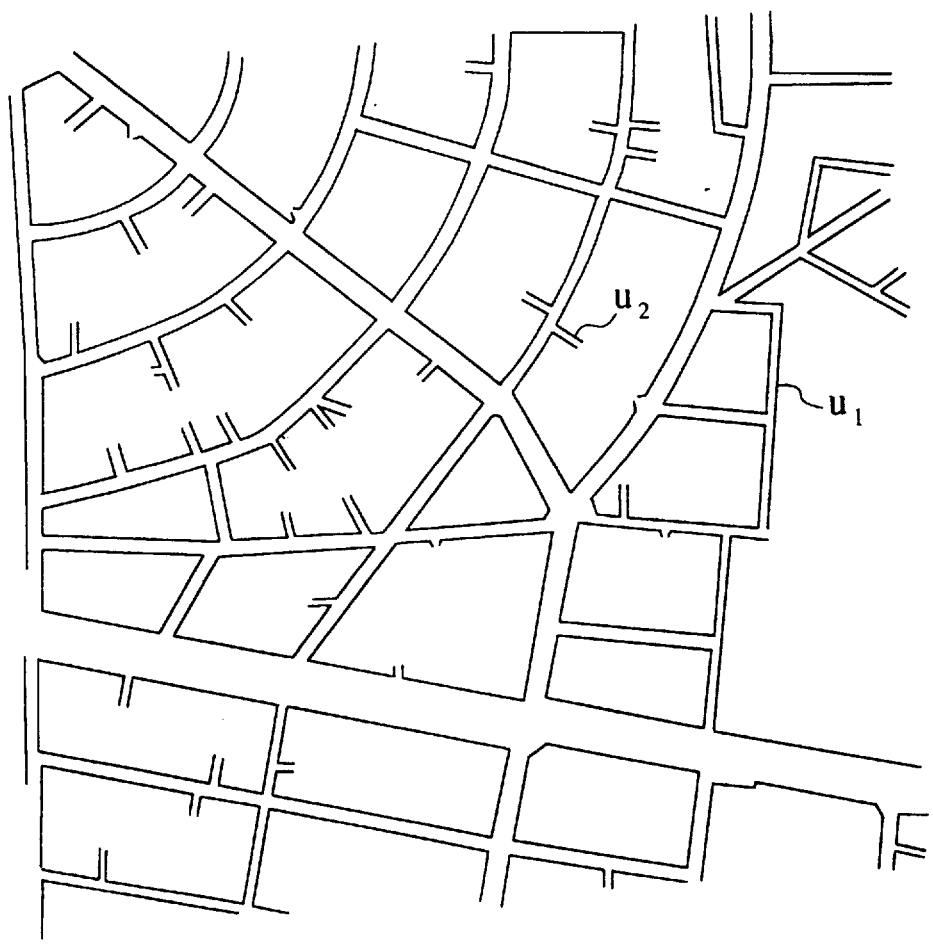
FIG. 36 is a fragmental view showing an example of the road margin figure in a large-scale map which being depicted on a reduced scale of 1/2500.
Figure 37:
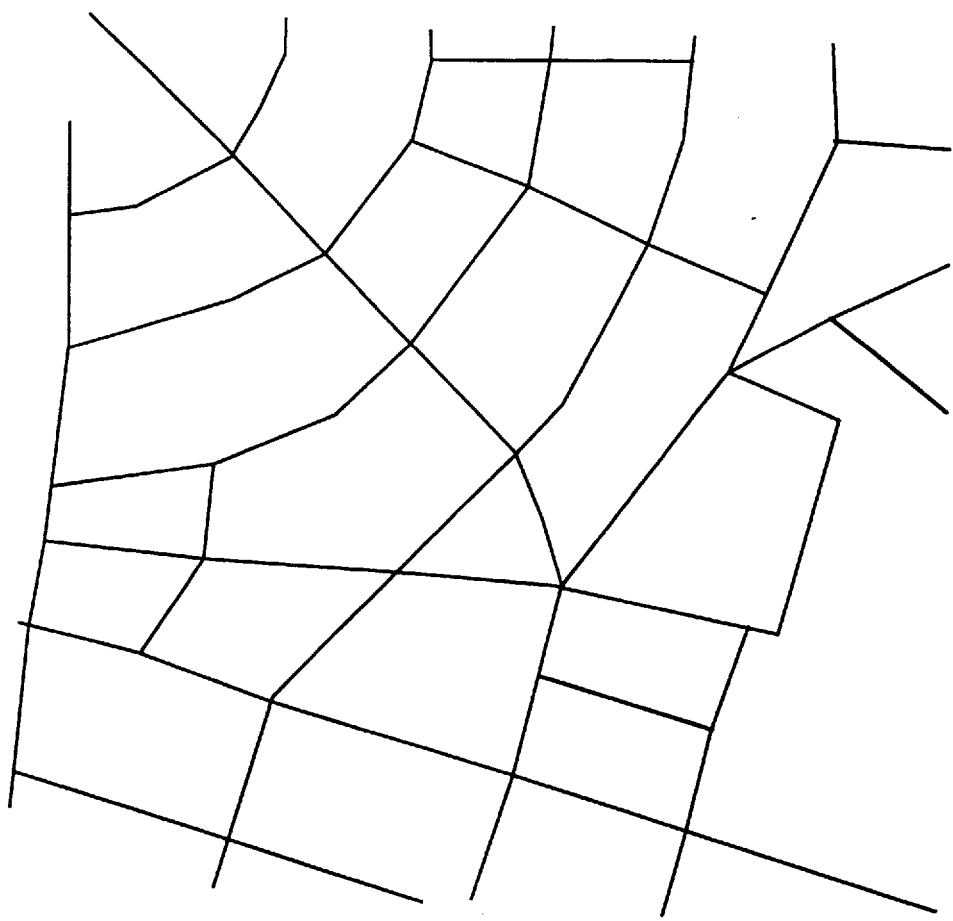
FIG. 37 is a view illustrative of an example of a road network map.
Figure 38:
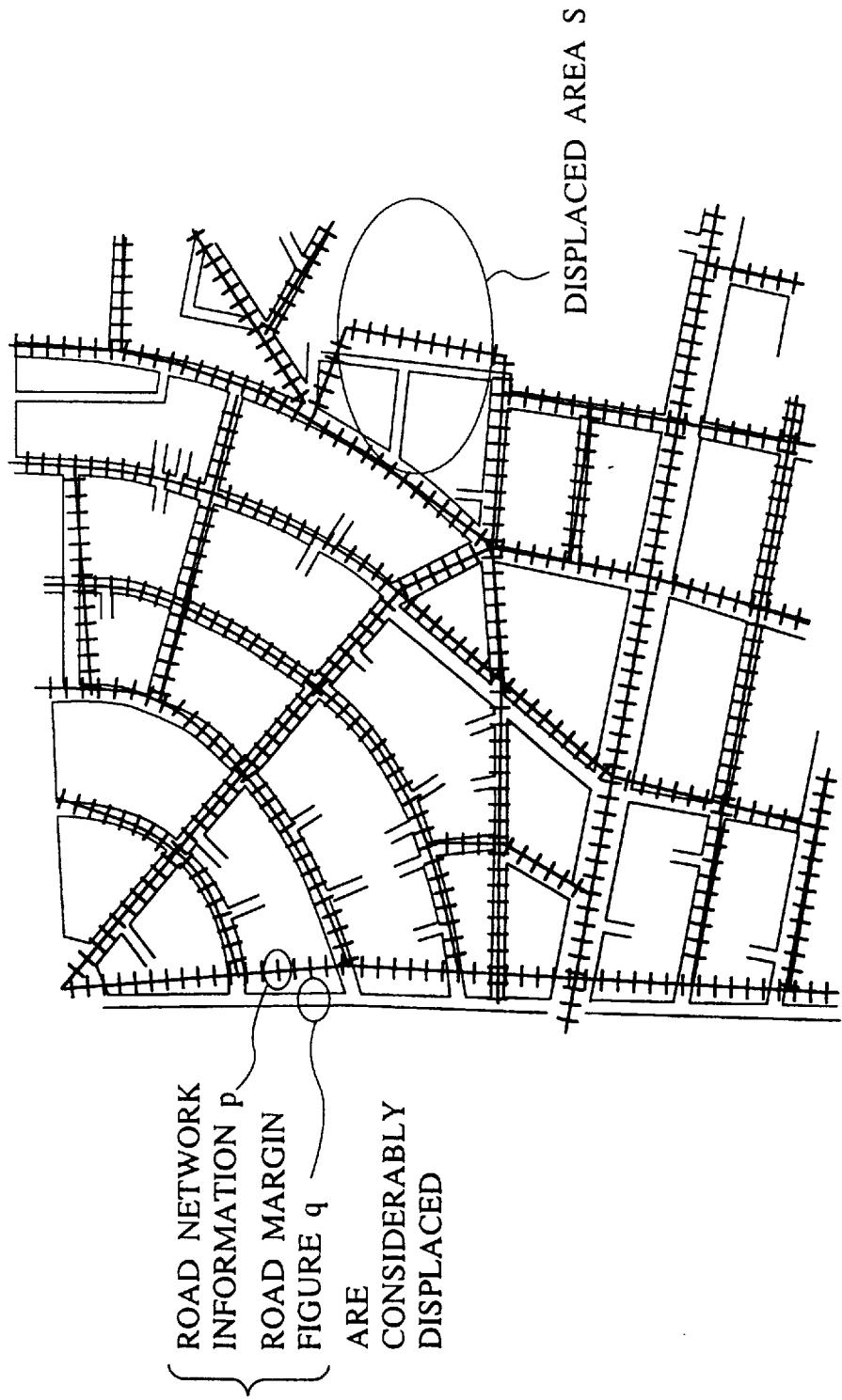
FIG. 38 is a fragmental view showing an example wherein a small-scale map and the large-scale map are transformed on the same coordinate system.

The road plane recognition processing portion 210 may receive information of road margin segments from a road margin figure information storing section 11 and center line information from a main road center line information storing section 19, and then recognize road plane sides relative to road margin figures corresponding to the center line on the basis of the center line information. Such center line information are rough since as aforementioned they have been obtained based on network information of the small-scale road network figures, so that road plane sides cannot be defined relative to narrow road plane margin segments, as described above. For instance, the road margin segment $u_1$ and the road margin segment $u_2$ in FIG. 36 cannot be recognized.

The unrecognized segment sequence road plane recognizing portion 220 comprises an unrecognized segment sequence extracting portion 221 and a road plane recognizing portion 222. The unrecognized segment sequence extracting portion 221 may extract road margin segments whose road plane sides are not defined (referred to as "unrecognized road margin segments" hereinafter). The road plane recognizing portion 222 may recognize road plane sides relative to extracted unrecognized road margin segments. Process effected in the unrecognized segment sequence road plane recognizing portion 220 will be described later. The paired road margin segment recognition processing portion 230 may recognize paired road margin segments constituting road planes which being newly recognized by the unrecognized segment sequence road plane recognizing portion 220. The center line extracting portion 240 may extract the center lines based on paired road margin segments recognized by the paired road margin segment recognition processing portion 230, and store resultant center lines together with the existing center lines in a detailed road network information storing section 21 either when all unrecognized road margin segments are recognized or every time when the center line is extracted.

According to the above process, road plane sides may be defined relative to unrecognized road margin segments on the basis of road margin segments whose road plane sides have been defined because their center lines are present, etc. and thus center lines may be obtained relative to unrecognized road margin segments, thus resulting in detailed road network information.

Figure 15:
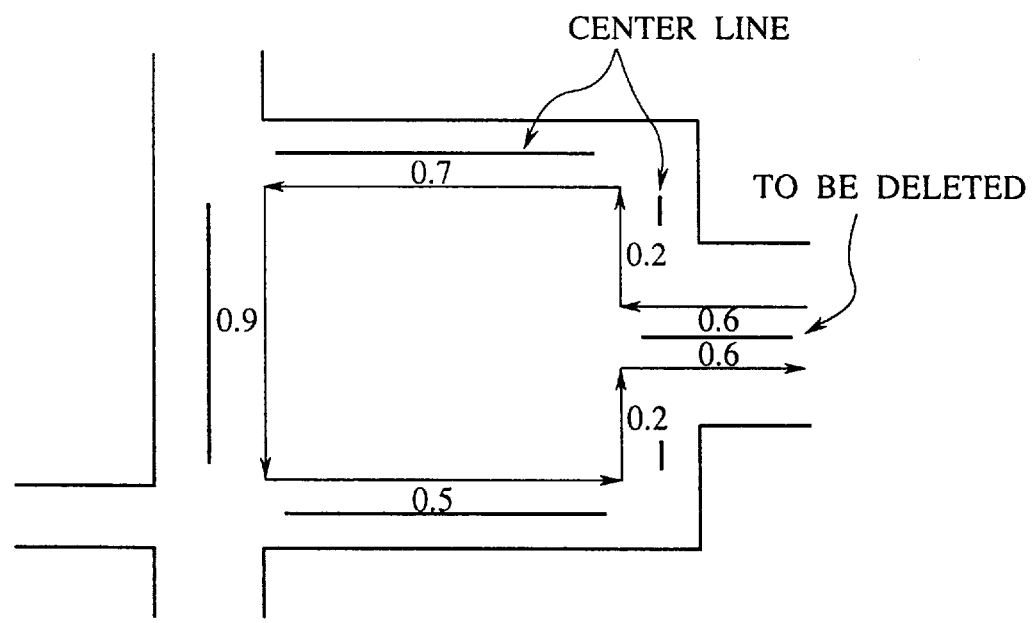
FIG. 15 is a fragmental view illustrating examples of road margin segments and center lines being input respectively from a road margin figure information storing section and a main road center line information storing section in FIG. 14.

In case road plane sides are recognized by the road plane recognition processing portion 210, there are some cases where improper center lines have been extracted. In that event, process for compensating such drawback would be carried out. For purposes of examples, it is assume that the road margin segments and the center lines as shown in FIG. 15 are input from the road margin figure information storing portion 11 and the road network figure information storing portion 13. In this case, improper center lines are removed with respect to inconsistent road margin segment sequences by adding the possibilities where right sides of respective segments are road plane sides (0.2+0.7+0.9+0.5+0.2) and adding the possibilities where left sides of respective segments are road plane sides (0.6+0.6), and then comparing these two sums.

Figure 16:
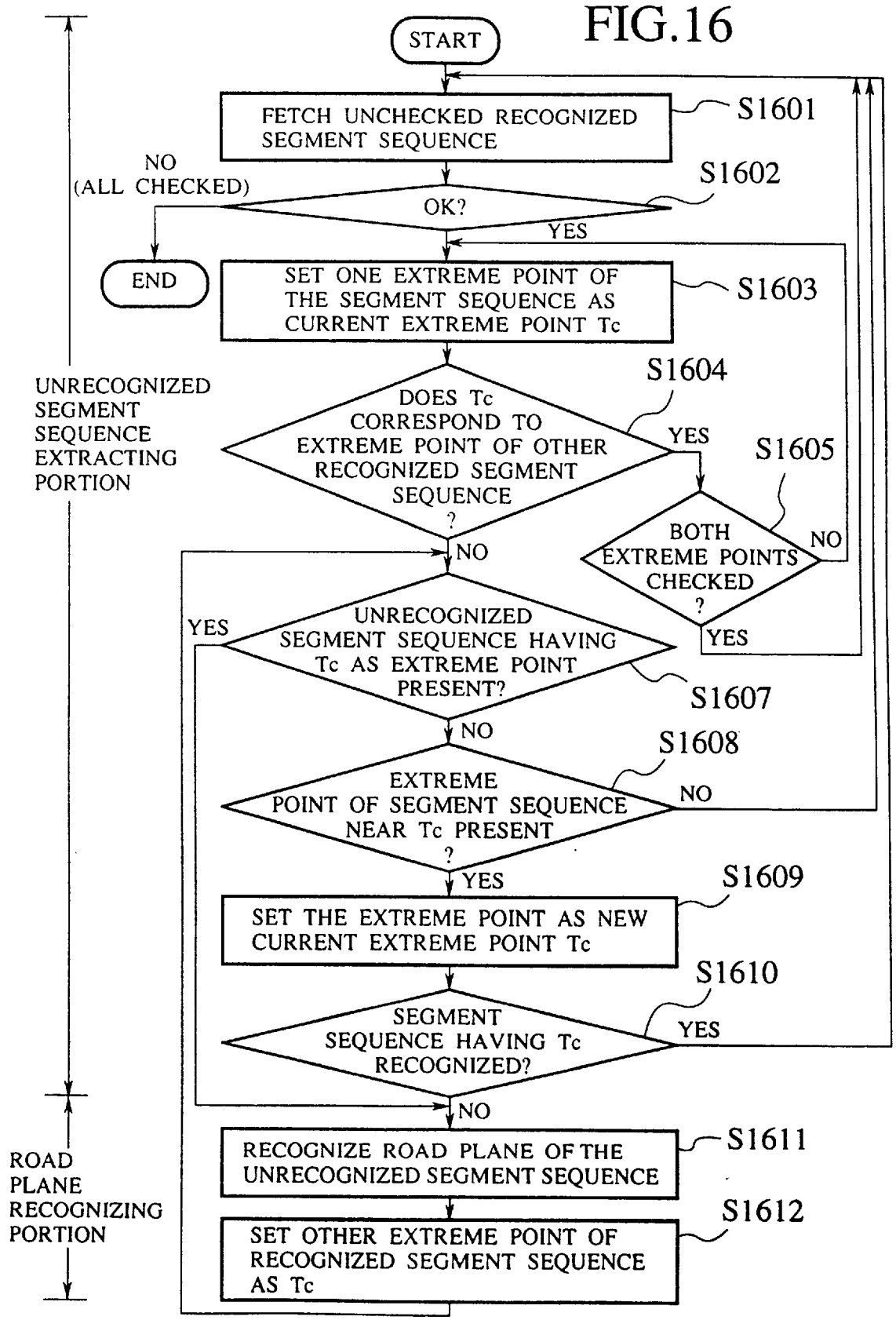
FIG. 16 is a flowchart illustrating detailed process contents in an unrecognized segment sequence road plane recognizing portion in FIG. 14.
Figure 17:
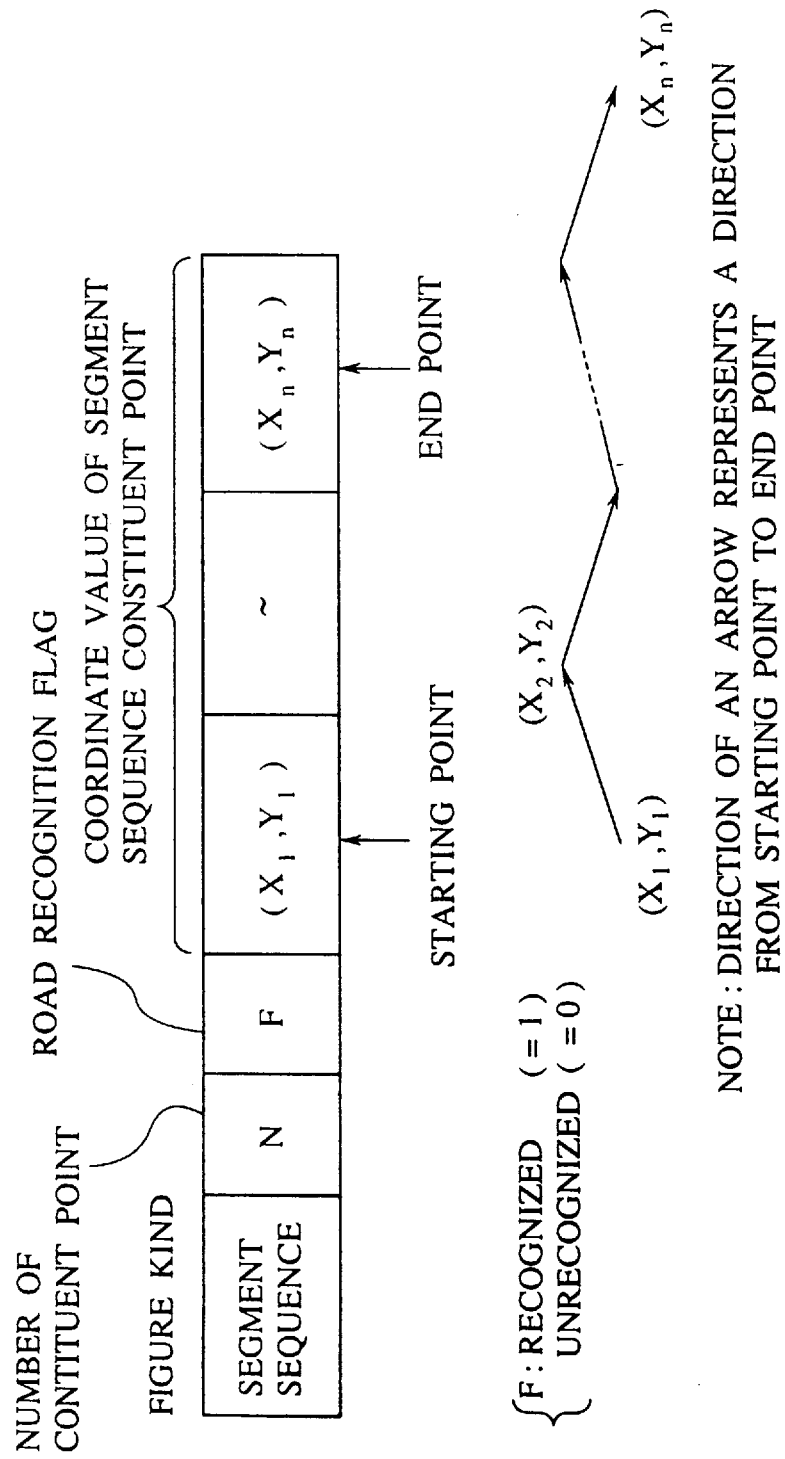
FIG. 17 is a view showing a data format consisting of a road margin segment sequence.

FIG. 16 is a flowchart illustrating details of process contents in the unrecognized segment sequence road plane recognizing portion 220. FIG. 17 is a view showing a data structure consisting of the road margin segment sequence. This data structure is composed of figure kind representing data kind, constituent point number N representing the number of points constituting segment sequence, road plane recognition flag F representing whether the road plane is recognized or not, fields of respective segment sequence constituent point coordinate values which are formed as sequences of coordinate values of points constituting the segment sequences.

In the event that road plane sides have already been defined because of presence of corresponding center lines, or the like, the road plane recognition flag F is set in an ON (="1") state. The coordinates of constituent points constituting segment sequences are aligned in the order to always show the right side as the road plane when the array of the coordinates is followed from starting points to end points. On the contrary, in the case of the segment sequences whose road plane sides have not been defined, the road plane recognition flag F still remains in an OFF (="0") state.

Process in the unrecognized segment sequence road plane recognizing portion 220 will be explained in detail with reference to FIGS. 16 to 19 hereinafter.

The unrecognized segment sequence extracting portion 221 may fetch road margin segment sequences whose road plane sides have been defined by the road plane recognition processing portion 210 (referred to as "recognized road margin segment sequence" hereinafter) one by one (step 1601). If there is no road margin segment sequence to be fetched (step 1602), the process will be terminated because it is determined that all road margin segment sequences whose road plane sides have been defined have already fetched. Then, in case the road margin segment sequence is fetched, one extreme point of the segment sequence is regarded as a current extreme point $T_c$ (step 1603). Next, it is determined whether or not a current extreme point $T_c$ constitutes an extreme point of other road margin segment sequence whose road plane sides have been defined (step 1604). In case it has been determined that the point $T_c$ constitutes the extreme point of other road margin segment sequence, it is determined that both extreme points of the fetched segment sequence have been checked (step 1605). If not checked, the process returns to step 1603 so as to check other extreme points. On the contrary, if it is determined that both extreme points of the fetched segment sequence have been checked, the process returns to step 1601 so as to fetch next segment sequence.

In step 1604, if it has been determined that the current extreme point $T_c$ does not constitute an extreme point of other road margin segment sequence whose road plane sides have been defined, then it is determined that there is unrecognized road margin segment sequence having the current extreme point $T_c$ as an extreme point (step 1607). If it is determined that there has been unrecognized road margin segment sequence having the current extreme point $T_c$ as the extreme point, i.e., that unrecognized road margin segment sequences are connected, the process goes to step 1611. In step 1611, road planes of the unrecognized road margin segment sequence may be recognized. This recognition may be effected by the above road plane recognizing portion 222. The road plane recognizing portion 222 may set another extreme point of the segment whose road plane has been defined as a new current extreme point $T_c$, then the unrecognized segment sequence extracting portion 221 is started. The process then returns to step 1607.

Figure 18:
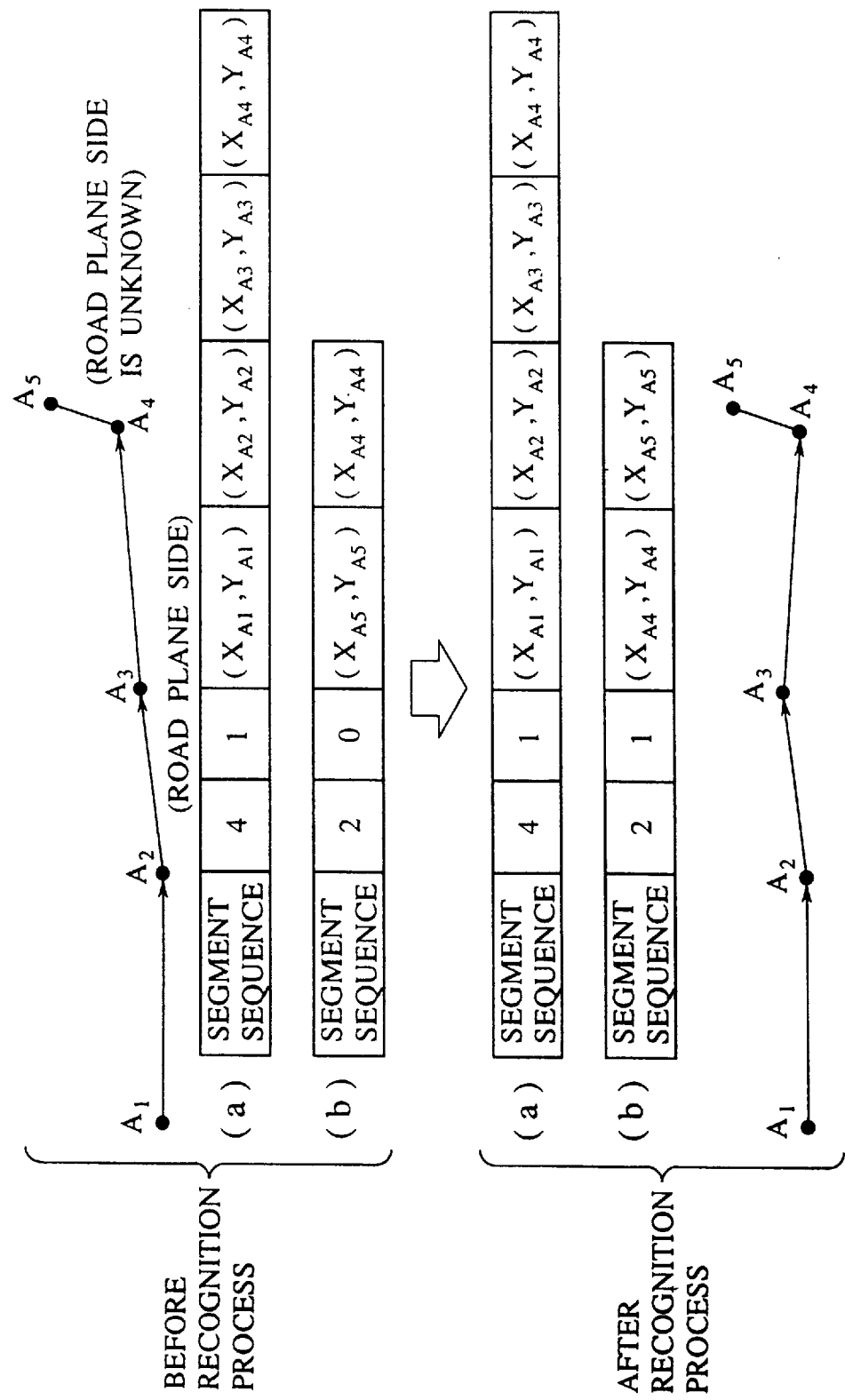
FIG. 18 is a view showing data formats consisting of particular segment sequences.

On the other hand, in step 1607, if it is determined that there is no unrecognized road margin segment sequence having the current extreme point $T_c$ as an extreme point, then it is determined whether or not there are extreme points of other segment sequences near the current extreme point $T_c$, i.e., it is determined whether or not there is segment sequence near the current extreme point $T_c$ (step 1608). Unless the extreme points of other segment sequences are near the current extreme point $T_c$, the process returns to step 1601 to fetch next unchecked recognized segment sequence. Conversely, if there are the extreme points of other segment sequences near the current extreme point $T_c$, such near extreme points are set as the current extreme points $T_c$ (step 1609). Then, it is determined whether or not the segment sequence having the current extreme point $T_c$ as an extreme point corresponds to the segment sequence whose road planes have been defined (step 1610). If the segment sequence corresponds to the segment sequence whose road planes have been defined, the process returns to step 1601 to fetch next unchecked recognized segment sequence. Conversely, if the segment sequence corresponds to the segment sequence whose road planes have not been defined, the process advances to step 1611 to recognize the road plane of the segment sequence The above process will be explained with reference to a particular example. FIG. 18 is a view showing data formats consisting of particular segment sequences. In FIG. 18, the segment sequences composed of points $A_1$, $A_2$, $A_3$, $A_4$, and $A_5$ are shown wherein road plane sides have been defined relative to the segment sequences composed of the points $A_1$ to $A_4$ while road plane sides have not been defined relative to the segment sequences composed of the points $A_4$ to $A_5$. Therefore, the segment sequences composed of the points $A_1$ to $A_4$ are expressed by data structure shown in (a) of FIG. 18 while the segment sequences composed of the points $A_4$ to $A_5$ are expressed by data structure shown in (b) of FIG. 18.

First, in FIG. 16, an unchecked recognized segment sequence $A_1$–$A_2$ is fetched (step 1601), and the point $A_1$ is set as a current extreme point (step 1603). Since the point $A_1$ does not constitute an extreme point of other road margin segment sequence whose road plane side has been defined (step 1604), it is then determined whether or not there exists unrecognized road margin segment sequence including the point $A_1$ as the extreme point (step 1607). There exists no unrecognized road margin segment sequence including the point $A_1$ as the extreme point, therefore it is then determined whether or not there exists unrecognized road margin segment sequence near the point $A_1$ (step 1608). But there exists no unrecognized road margin segment sequence near the point $A_1$, then the process returns to step 1601.

Subsequently, an unchecked recognized segment sequence $A_2$–$A_3$ is fetched (step 1601), and the case where the points $A_2$ and $A_3$ are employed as the current extreme points is treated repeatedly with the same process as in the case where the point $A_1$ has been employed as the current extreme point.

If the point $A_4$ has been set as current extreme point in step 1603, the point $A_4$ does not constitute an extreme point of other road margin segment sequence whose road plane side has been defined (step 1604). Then, it is determined whether or not there exists unrecognized road margin segment sequence including the point $A_4$ as the extreme point (step 1607). In this event, since there exists unrecognized road margin segment sequence including the point $A_4$ as the extreme point, the process then proceeds to step 1611.

Upon recognizing the road plane of unrecognized road margin segment sequence in step 1611, the road plane must be so defined that the road plane is always situated on the right side of the segment sequence when the segment sequence is viewed from its starting point toward its end point. In this event, since the current extreme point $A_4$ has been the end point in the unrecognized road margin segment sequence (b) in FIG. 18, i.e., the unrecognized road margin segment sequence (b) has been expressed by the segment sequence $A_5$–$A_4$, the unrecognized road margin segment sequence (b) is converted into an recognized road margin segment sequence, and then the extreme points $A_4$ and $A_5$ are recognized respectively as next starting point and end point. Thereby, as shown in the lower portion of FIG. 18, the segment sequence is rearranged like the segment sequence $A_4$–$A_5$, and road recognition flag F is set at 1.

Subsequently, the point $A_5$ is recognized to be a new current extreme point in step 1612, then the process returns to step 1607. Since there exists no unrecognized road margin segment sequence including the point $A_5$ as the extreme point (step 1607), it is then determined whether or not there exists unrecognized road margin segment sequence near the point $A_5$ (step 1608). But there exists no unrecognized road margin segment sequence near the point $A_5$, therefore the process then returns to step 1601. Even if it is tried to fetch an unchecked recognized segment sequence in step 1601, all recognized segment sequences have already been checked (step 1602). Hence, a series of recognition processes of road plane are terminated.

Figure 19:
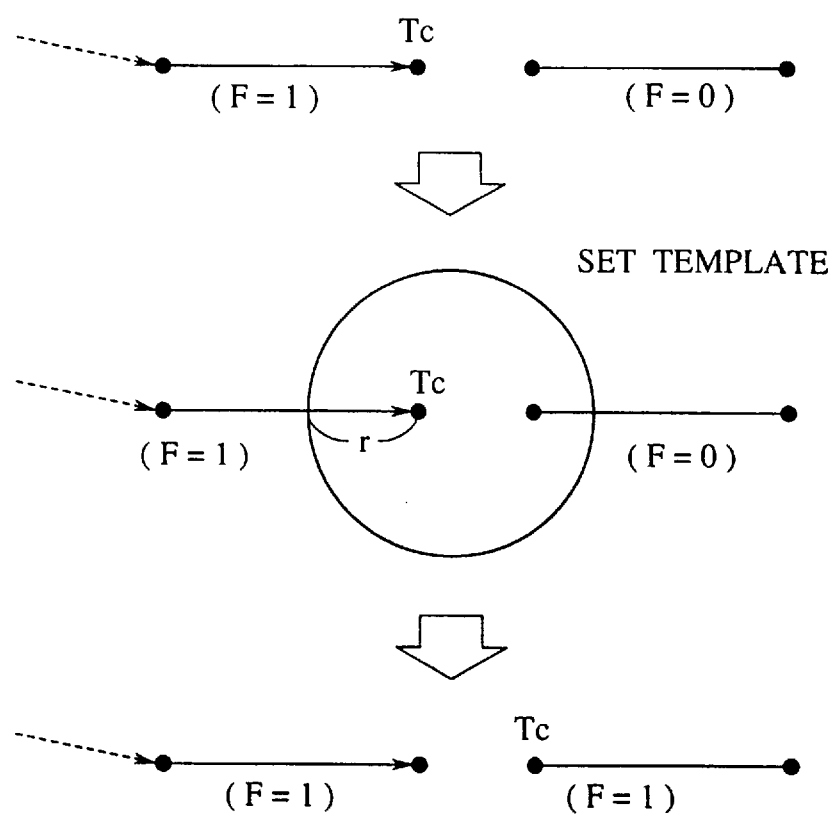
FIG. 19 is a view illustrative of a particular method which being effective in process of the road margin figure including the disconnected road margin segment.

Next, detailed procedures effected in processes in steps 1608 to 1610 in FIG. 16 will be explained. These procedures are effective in process of the road margin figures including disconnected road margin segments shown in FIG. 36. FIG. 19 is a view illustrative of a particular method.

As shown in FIG. 19, in case the current extreme point $T_c$ is not an extreme point of unrecognized road margin segment sequence, a template having a radius r (e.g., maximum road width which can be expressed on the reduced scale in the map being subjected to the process) centered at the extreme point $T_c$ is set. It is then determined whether or not an extreme point of other road margin segment sequence exists in the template (step 1608). If no extreme point of other road margin segment sequence exists in the template, the segment sequence having the current extreme point $T_c$ may be regarded as an isolated segment sequence. The process then returns to step 1601. Conversely, if the extreme point of other road margin segment sequence exists in the template, the extreme point is set to be a new current extreme point $T_c$ (step 1609). It is then determined whether or not the road plane has already recognized with respect to the segment sequence having the current extreme point $T_c$ (step 1610). Unless the road plane has already recognized relative to the segment sequence having the current extreme point $T_c$, then the process advances to step 1611 to recognize road plane. Upon recognizing road plane, by assuming the new current extreme point as the starting point if previous current extreme point is the end point, or by assuming the new current extreme point as the end point if previous current extreme point is the starting point, the road plane side may be recognized as for the disconnected portions of the road margin segment.

Figure 20A:
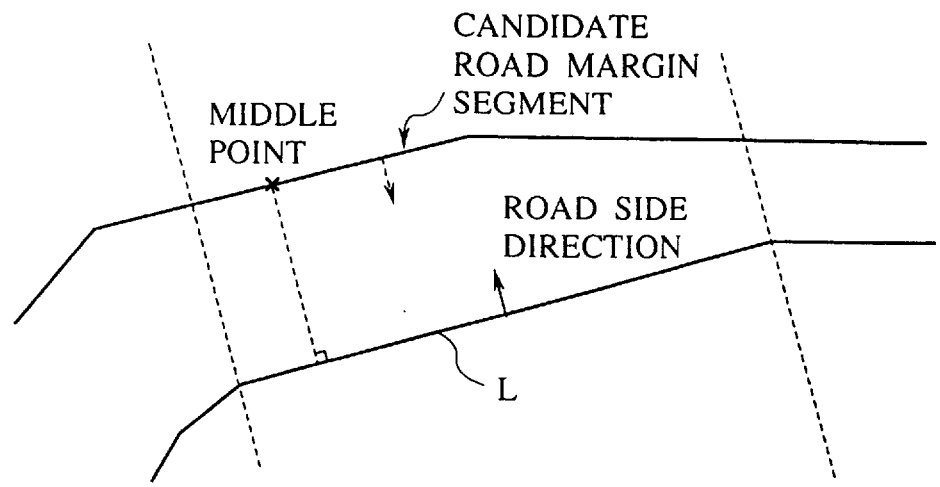
FIGS. 20A and 20B are views illustrative of particular conditions for extracting a pair of road margin segments by a paired road margin segment recognition processing portion in FIG. 14.
Figure 20B:
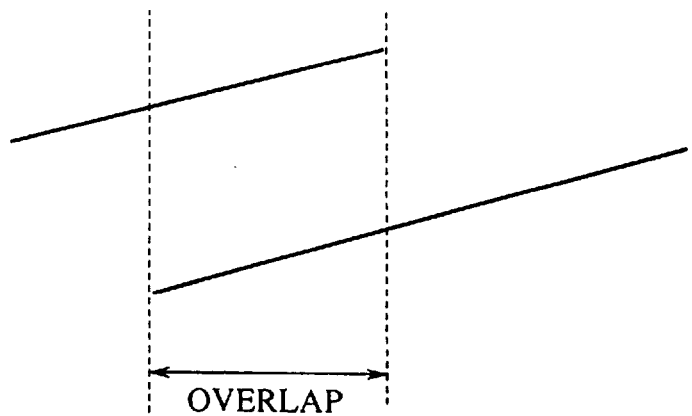

Next, concrete conditions for extracting paired road margin segments in the paired road margin segment recognition processing portion 230 will be explained. FIGS. 20A and 20B are views illustrative of particular conditions for extracting a pair of road margin segments by the paired road margin segment recognition processing portion 230.

In FIG. 20A, in case a road margin segment to be paired with the road margin segment L is detected, such conditions are required that, for example, the road margin segment has road side direction opposing to that of the road margin segment L, at least a part of the road margin segment is included in an area defined by the road margin segment L, the road margin segment has a shortest distance from the middle point thereof to the road margin segment L, and an angle between the road margin segment and the road margin segment L is less than a predetermined angle and is close to parallel.

As shown in FIG. 20B, if the road margin segment is closely parallel to the X axis, it is checked whether or not the center line can be extracted from the road, by checking whether or not the road margin segment and the road margin segment L are overlapped in an area defined by the X axis area. On the contrary, if the road margin segment is closely parallel to the Y axis, it is checked whether or not the road margin segment and the road margin segment L are overlapped in an area defined by the Y axis area.

Figure 21:
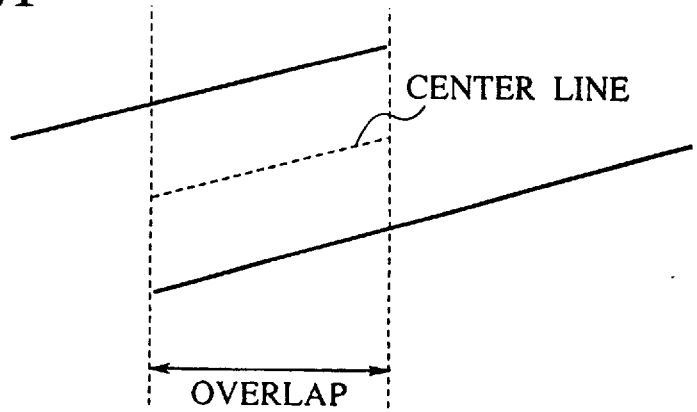
FIG. 21 is a view illustrative of particular method of extracting center line by a center line extracting portion in FIG. 14.

Next, a concrete method of extracting center lines in the center line extracting portion 240. FIG. 21 is a view illustrative of particular method of extracting center line by the center line extracting portion 240. As shown in FIG. 21, the center line can be extracted by connecting middle points between respective extreme points on both ends of overlapped portions of the road margin segments. At this time, it is checked whether or not the detected center line intersects with road margin segments and, if so, the detected center line may be canceled.

As stated above, detailed center lines, i.e., road network information can be depicted by extracting phase information, i.e., road plane side information from road margin segments whose road plane sides are defined, and employing such phase information together with center line information derived previously by the first configuration.

Figure 22:
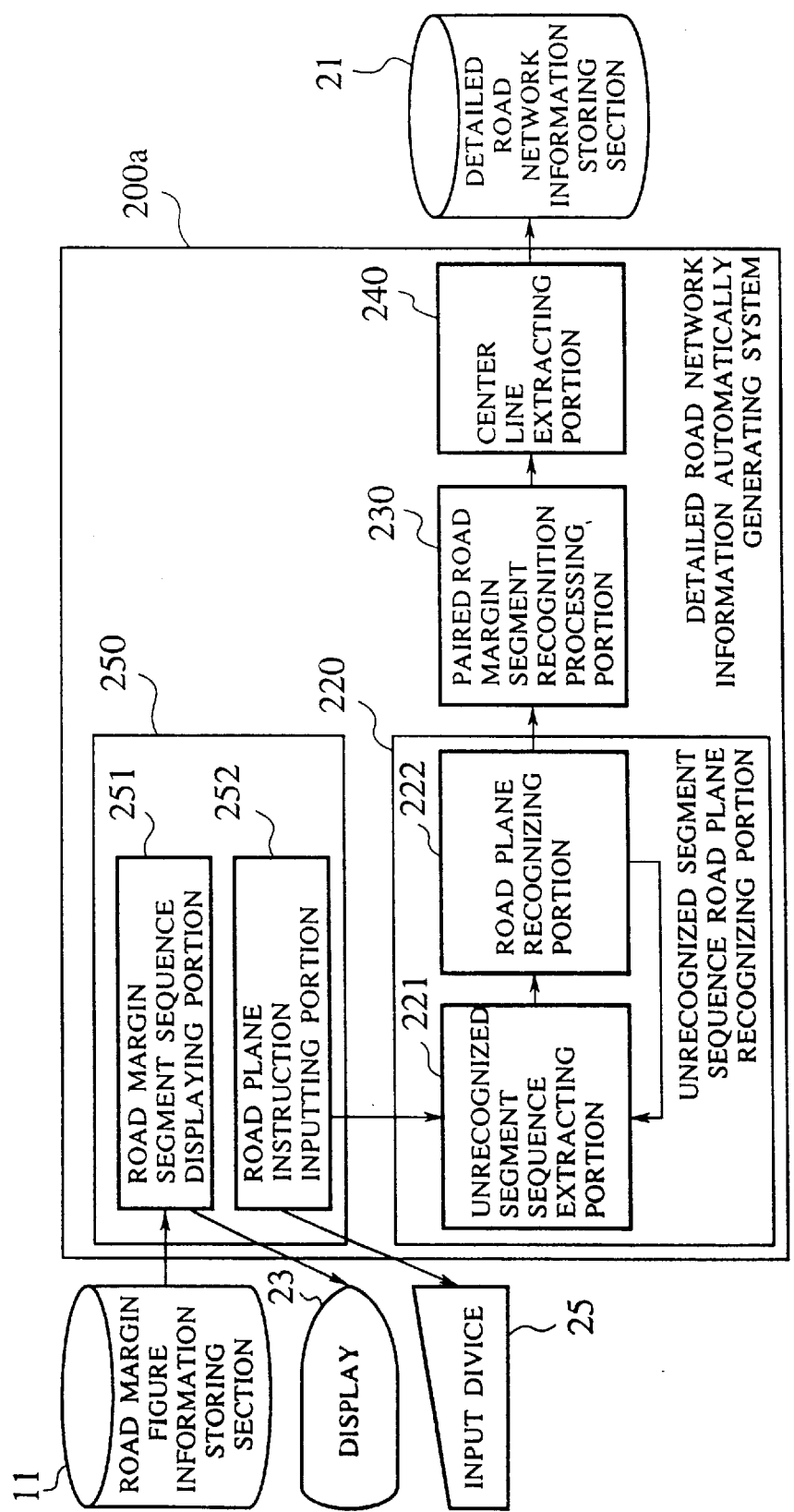
FIG. 22 is a block diagram showing another example of the second configuration of the apparatus for automatically generating road network information according to the embodiment of the present invention.

FIG. 22 is a block diagram showing another example of the second configuration of the apparatus for automatically generating road network information according to the embodiment of the present invention. In the example, rough center line information of the road are not provided, but the operator may designate road plane side relative to part of road margin segment in an interactive manner, and then center lines may be extracted from road margin segments whose road plane side have not designated yet, based on road margin segments whose road plane sides have been designated.

The operator selects a part of road margin segments from road margin segment sequences displayed on a display 23 via an input device 25, then recognizes road plane sides of the road margin segments, and then informs the unrecognized segment sequence road plane recognizing portion 220 of them. Like the above, the unrecognized segment sequence road plane recognizing portion 220 may recognize sequentially road plane side of the unrecognized road margin segment sequence on the basis of these information. Also, process contents in the paired road margin segment recognition processing portion 230 and the center line extracting portion 240 are similar to foregoing contents.

According to this method, since process according to wrong center line information can be eliminated, process can implemented precisely.

Center lines, i.e., road network information have been obtained with respect to narrow roads according to the above second configuration. However, there are some cases where incomplete center lines have been extracted according to the second configuration because they are disconnected in the crossing, for example. Therefore, the third configuration will be carried out so as to construct finished center lines, i.e., finished road network information by interpolating such disconnection.

Figure 23:
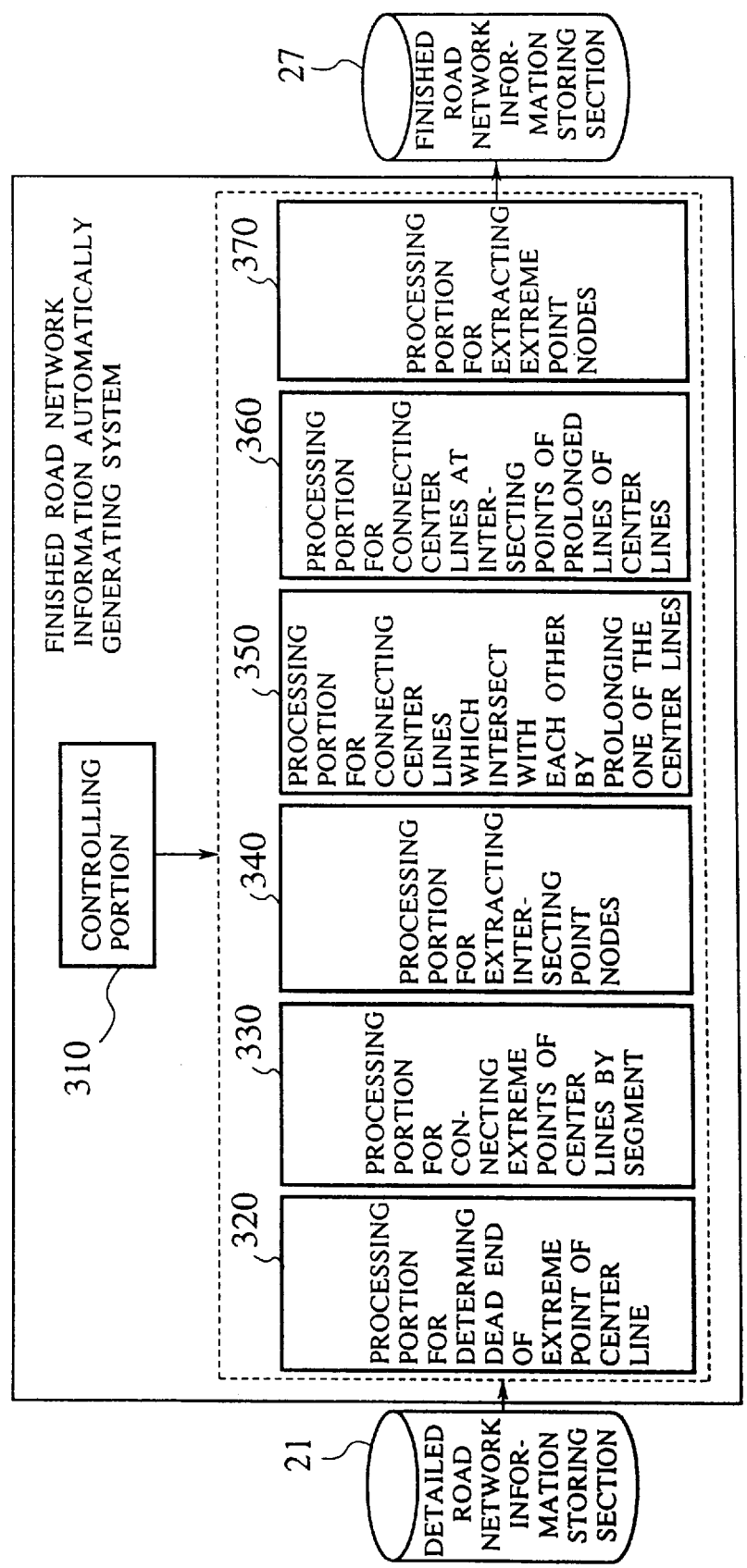
FIG. 23 is a block diagram showing a third configuration of the apparatus for automatically generating road network information according to the embodiment of the present invention.

FIG. 23 is a block diagram showing the third configuration of the apparatus for automatically generating road network information according to the embodiment of the present invention. A finished road network information automatically generating system 300 for embodying the third configuration comprises a processing portion 320 for determining dead end of extreme point of center line; a processing portion 330 for connecting extreme points of center lines by segment; a processing portion 340 for extracting intersecting point nodes; a processing portion 350 for connecting center lines which intersect with each other by prolonging one of the center lines; a processing portion 360 for connecting center lines at intersecting points of prolonged lines of center lines; and a processing portion 370 for extracting extreme point nodes. In addition, a controlling portion 310 for controlling above respective processing portions is also included.

The finished road network information automatically generating system 300 may receive detailed center line information from a detailed road network information storing section 21, then accomplish respective processes by means of respective processing portions, and then output obtained finished center line information to a finished road network information storing section 27. Respective processing portions will be explained hereinafter.

Figure 24:
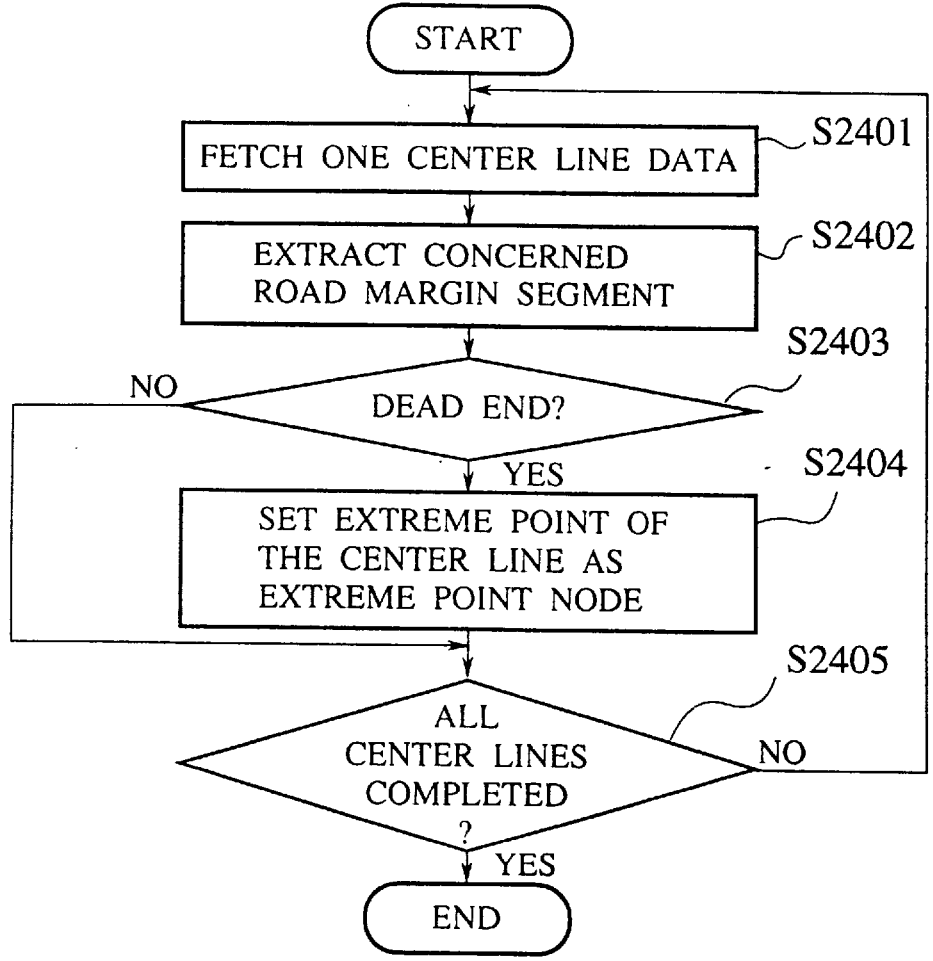
FIG. 24 is a flowchart illustrating process procedure in a processing portion in FIG. 23 for determining whether or not an extreme point of the center line is a dead end.
Figure 25:
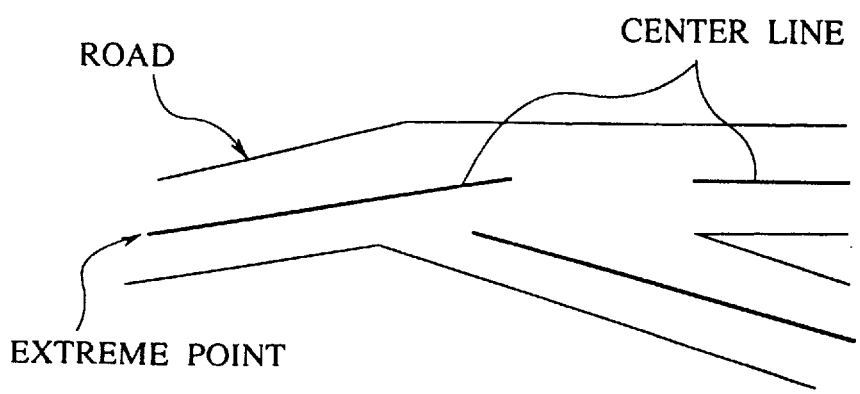
FIG. 25 is a view illustrative of process in the processing portion in FIG. 24.

FIG. 24 is a flowchart illustrating process procedure in the processing portion 320 for determining whether or not an extreme point of the center line is a dead end. FIG. 25 is a view illustrative of process in the processing portion 320. First, center line data is fetched (step 2401). A concerned road margin segment is extracted by paying attention to a leading point and a tail point of the center line (step 2402). It is then determined whether or not the extreme point of the center line is an dead end based on the concerned road margin segments (step 2403). Such determination is conducted under following decision criterions, for instance. Specifically, extracted road margin segment is the head of paired road margin segment or not, or the extreme point of extracted road margin segments is close to the extreme point of the center line or not. As a result of the decision, if the extreme point of the center line has been determined as the dead end, the extreme point of the center line is then set to be an extreme point node (step 2404). In this event, data concerning coordinates of the extreme points, etc. are stored in a predetermined file. On the other hand, if the extreme point of the center line has not been determined as the dead end, the process then returns directly to step 2405. In step 2405, it is determined whether or not all center lines have been checked and, if not, the process returns to step 2401. If check of all centerlines has been completed, a series of processes are then terminated.

Figure 26:
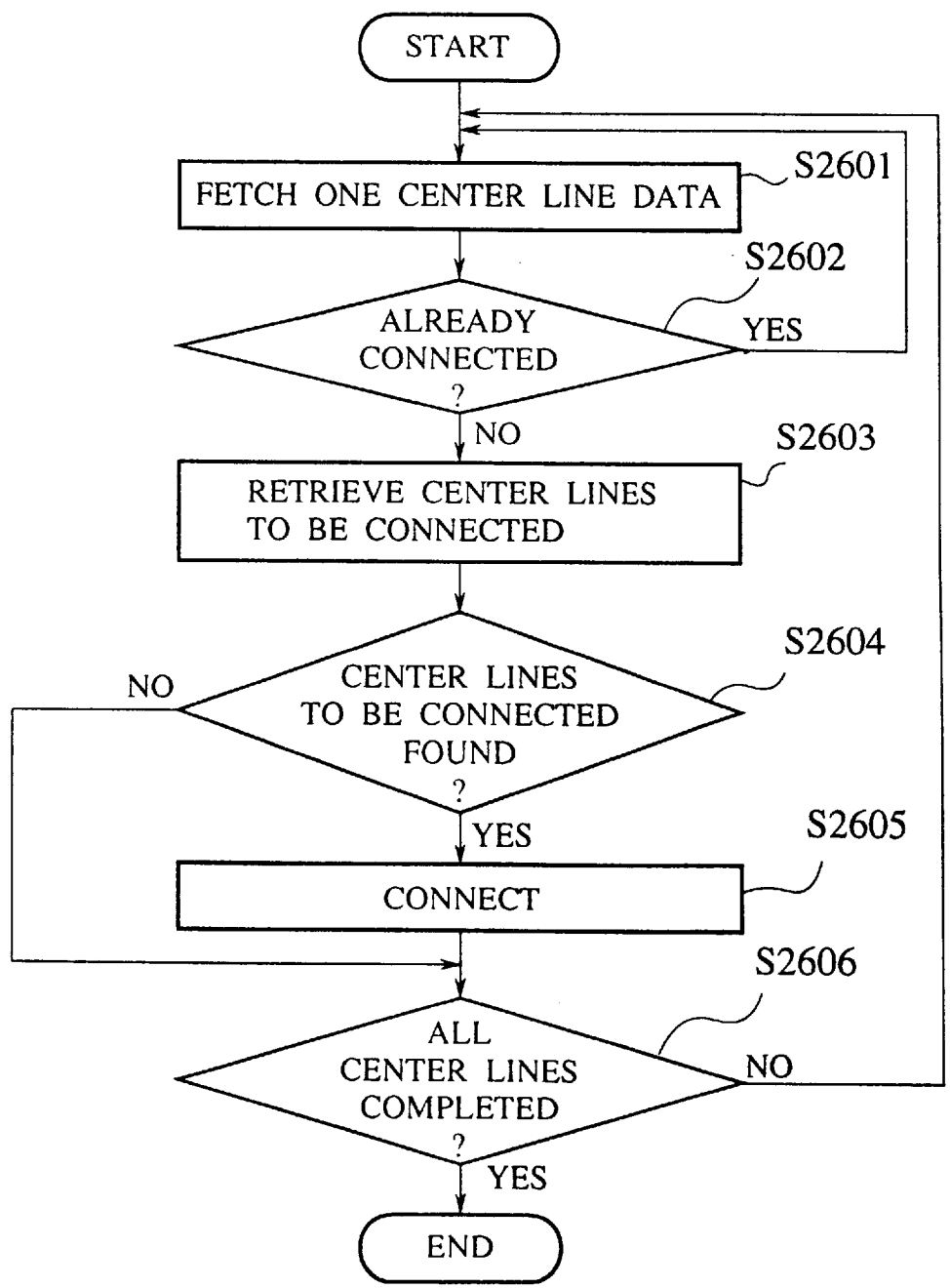
FIG. 26 is a flowchart illustrating process procedure in a processing portion in FIG. 23 for connecting extreme points of the center lines by segments.
Figure 27A:
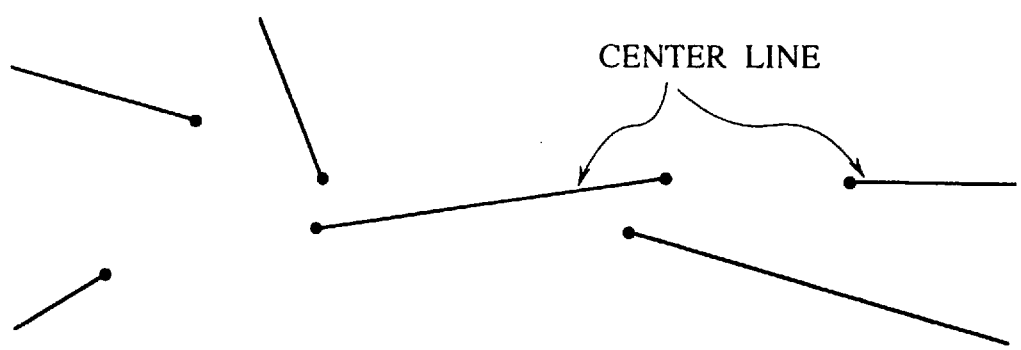
FIGS. 27A and 27B are views illustrative of process in the processing portion in FIG. 26.
Figure 27B:
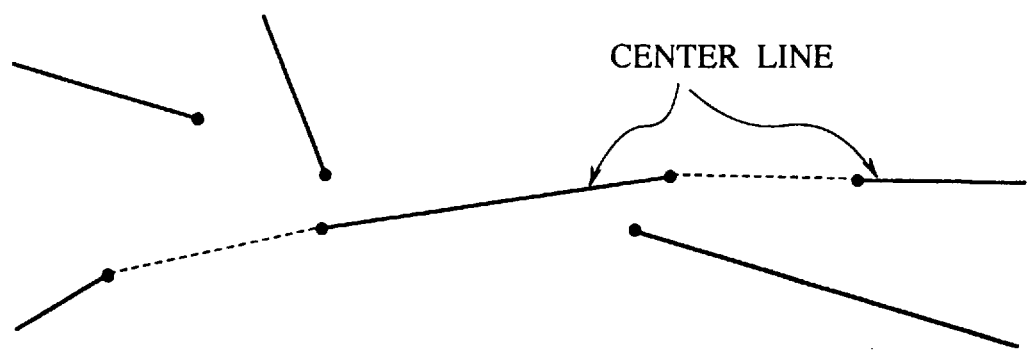

FIG. 26 is a flowchart illustrating process procedure in the processing portion 330 for connecting extreme points of the center lines by segments. FIGS. 27A and 27B are views illustrative of process in the processing portion 330. First, center line data is fetched (step 2601). It is determined whether or not both extreme points of the center line have already connected (step 2602). The process returns to step 2601 to fetch next center line if both extreme points have already connected, whereas other center lines to be connected are retrieved if both extreme points have not connected yet (step 2603). Conditions for connecting extreme points are that, for example, a distance between the extreme points is less than a predetermined value, an angle between the center lines is less than a predetermined value, and connected center lines do not intersect with the road margin segment. In turn, it is determined whether or not there exist center lines to be connected (step 2604). If yes, process for connecting them is effected (step 2605). More particularly, by way of example, newly generated center line is registered in a predetermined file, and both extreme points are marked as "already connected". In case plural center lines to be connected are retrieved, a center line which most corresponds to the conditions should be selected. On the contrary, no center lines to be connected exists, then the process advances directly to step 2606. In step 2606, it is determined whether or not check of all center lines has been completed. If no, the process then returns to step 2601 while, if yes, a series of processes are ended.

Figure 28:
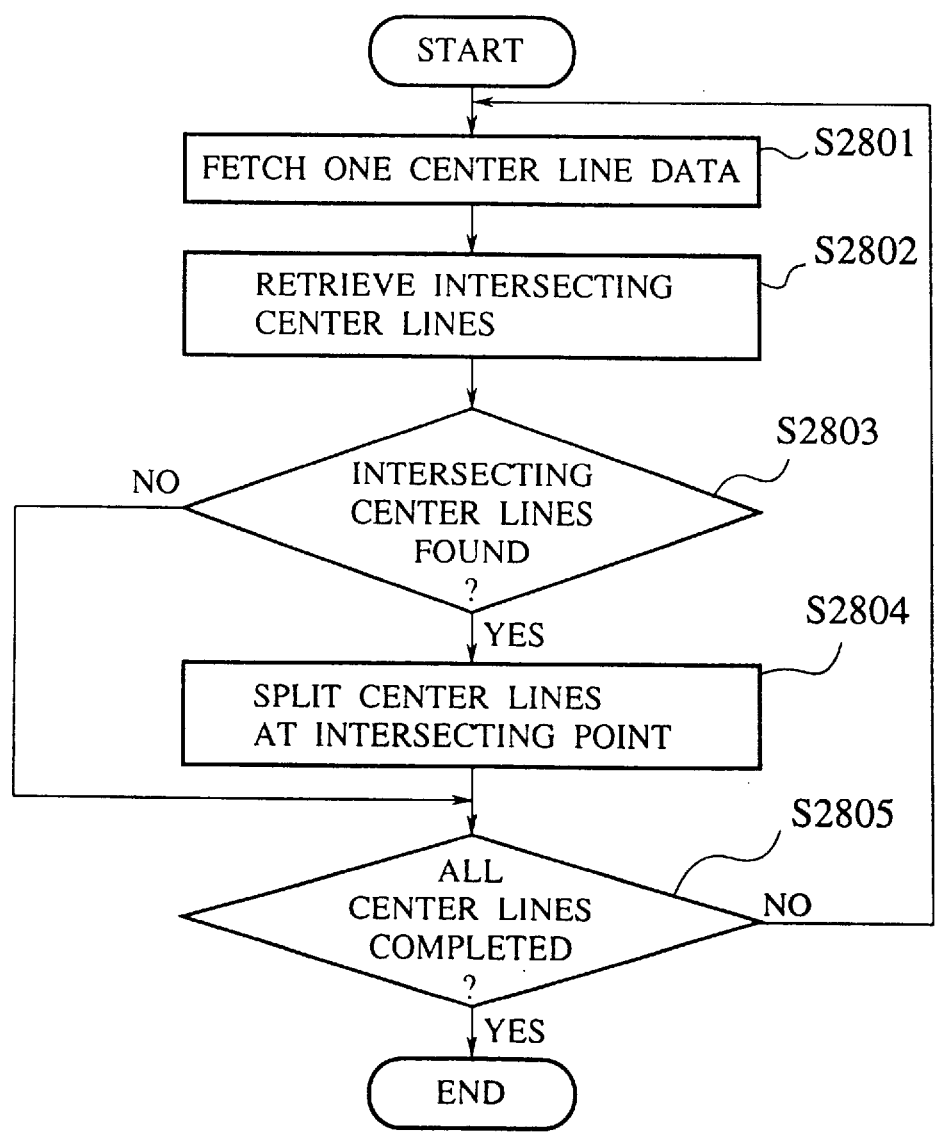
FIG. 28 is a flowchart illustrating process procedure in a processing portion in FIG. 23 for calculating intersecting point nodes.
Figure 29A:
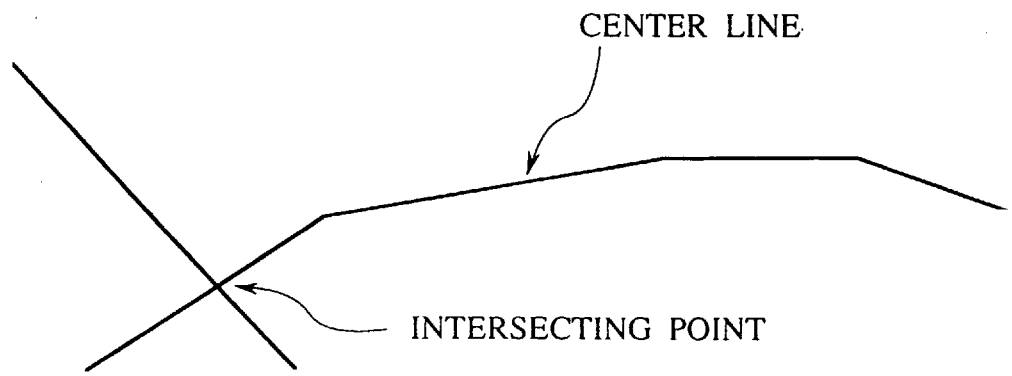
FIGS. 29A and 29B are views illustrative of process in the processing portion in FIG. 28.
Figure 29B:
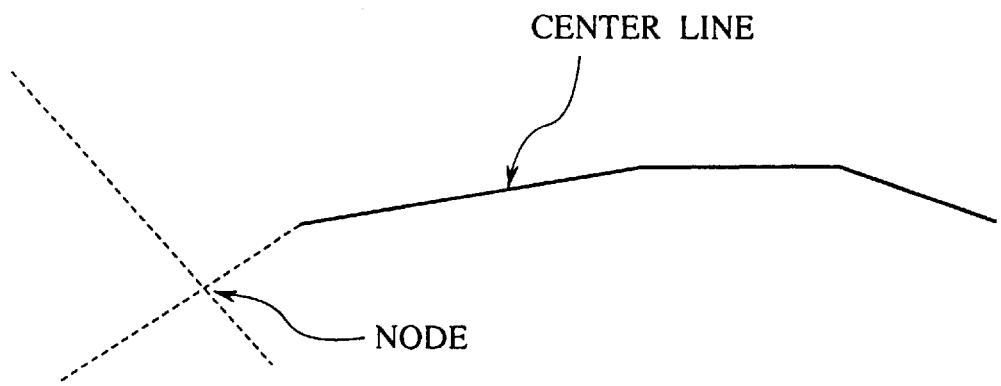

FIG. 28 is a flowchart illustrating process procedure in the processing portion 340 for calculating intersecting point nodes. FIGS. 29A and 29B are views illustrative of process in the processing portion 340. First, center line data is fetched (step 2801). Other center lines intersecting with the center line are then retrieved (step 2802). It is then decided whether or not other center lines intersecting with the center line have been found (step 2803). If yes, respective center lines are split at the intersecting points (step 2804) while, if no, the process then proceeds to step 2805. In step 2805, it is determined whether or not all center lines have been checked. If no, the process then returns to step 2801 while, if yes, a series of processes have been terminated.

Figure 30:
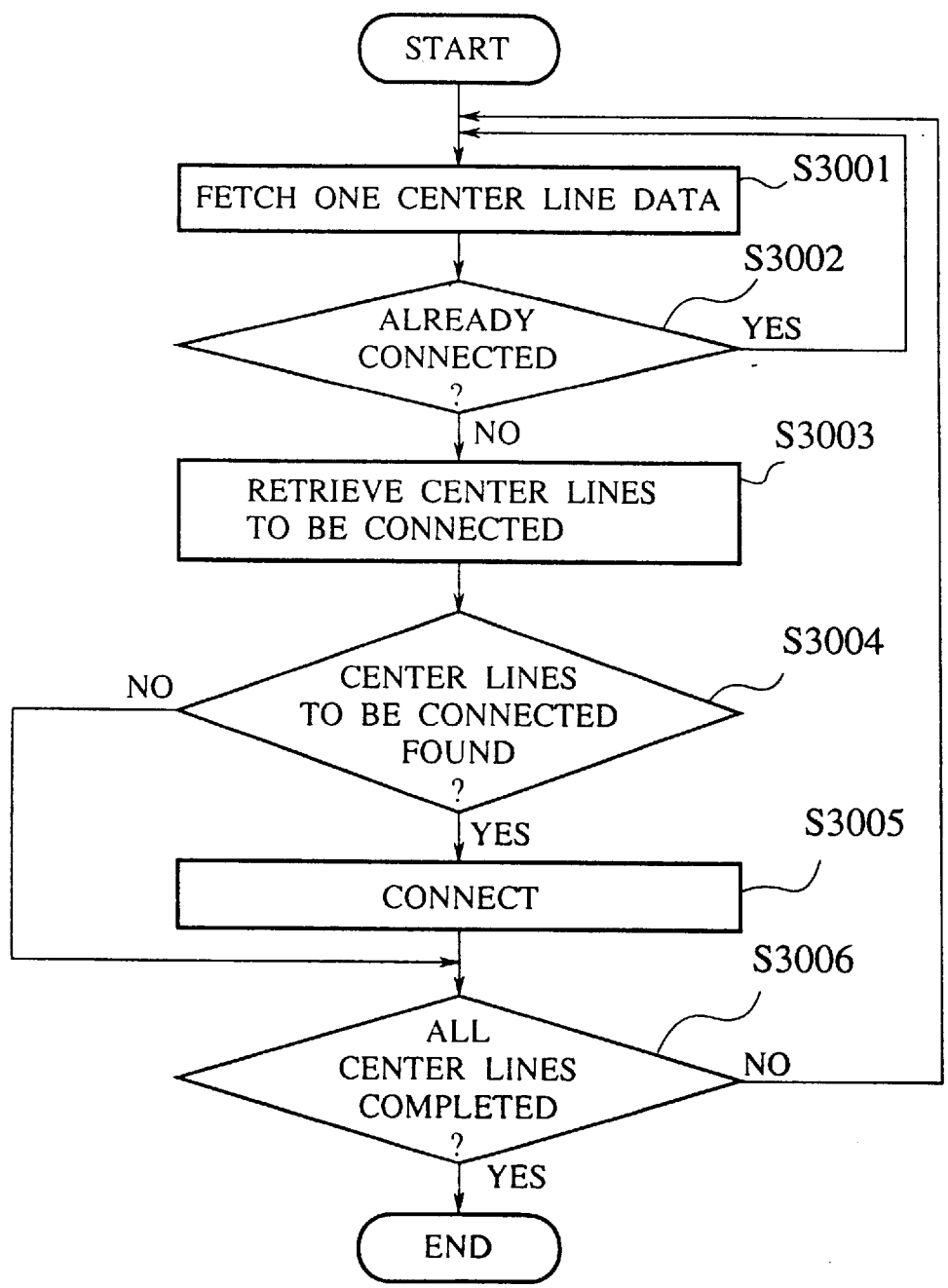
FIG. 30 is a flowchart illustrating process procedure in a processing portion in FIG. 23 for connecting center lines which intersect with a prolonged line of the center line.
Figure 31A:
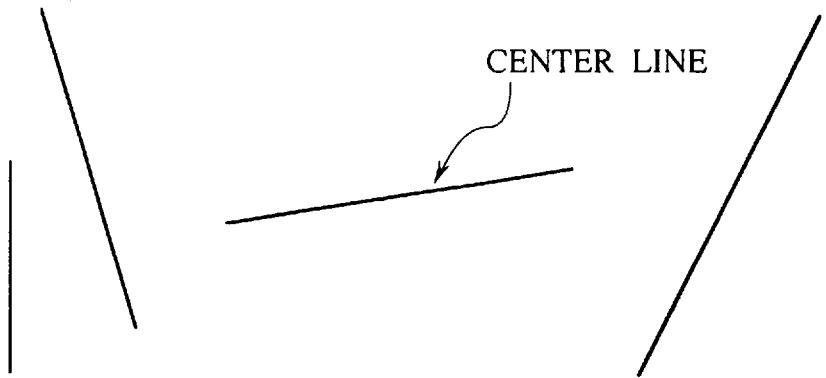
FIGS. 31A to 31C are views illustrative of process in the processing portion in FIG. 30.
Figure 31B:
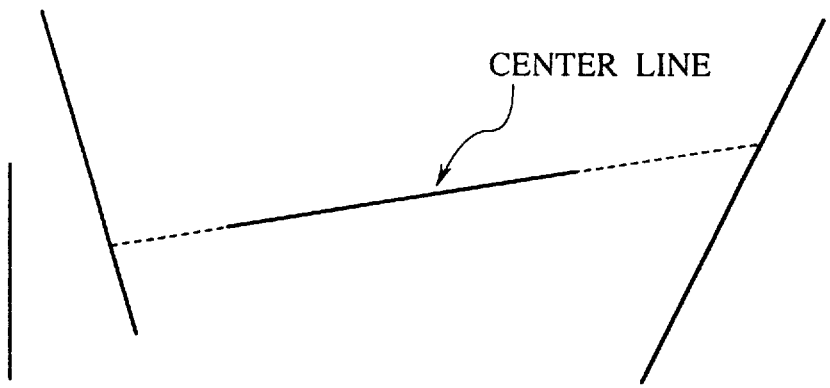
Figure 31C:
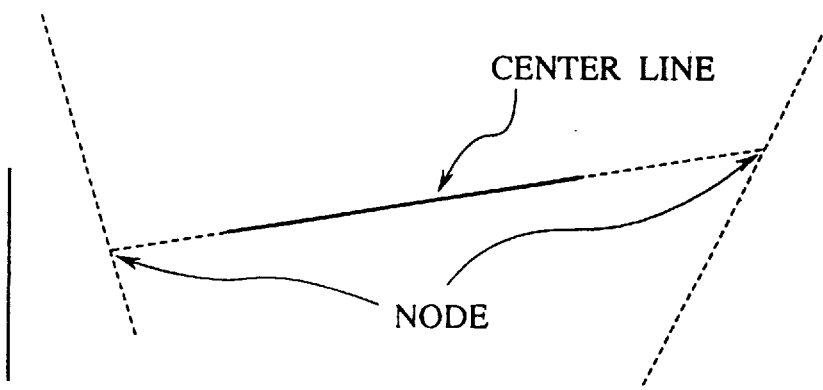

FIG. 30 is a flowchart illustrating process procedure in the processing portion 350 for connecting center lines which intersect with each other by prolonging one of the center lines. FIGS. 31A to 31C are views illustrative of process in the processing portion 350. First, center line data is fetched (step 3001). It is determined whether or not both extreme points of the center line have already connected (step 3002). The process returns to step 3001 to fetch next center line if both extreme points have already connected, whereas other center lines to be connected are retrieved if both extreme points have not connected yet (step 3003). Conditions for connecting center lines are that, for example, prolonged line of a center line intersects with other center line, distance between the prolonged center line and the intersecting point is less than a predetermined distance, and connected center lines do not intersect with the road margin segment. In turn, it is determined whether or not there exist any center line to be connected (step 3004). If yes, process for connecting them is effected (step 3005). In particular, for example, selected center line is actually prolonged and is registered in a predetermined file, and the center line(s) coupled to the selected center line is(are) split at the intersecting point(s). In addition, intersecting point(s) is(are) marked as "already connected". In case plural center lines to be connected are retrieved relative to each extreme point, a center line which most corresponds to the conditions should be selected. On the contrary, no center lines to be connected exists, then the process advances directly to step 3006. In step 3006, it is determined whether or not check of all center lines has been completed. If no, the process then returns to step 3001 while, if yes, a series of processes are completed.

Figure 32:
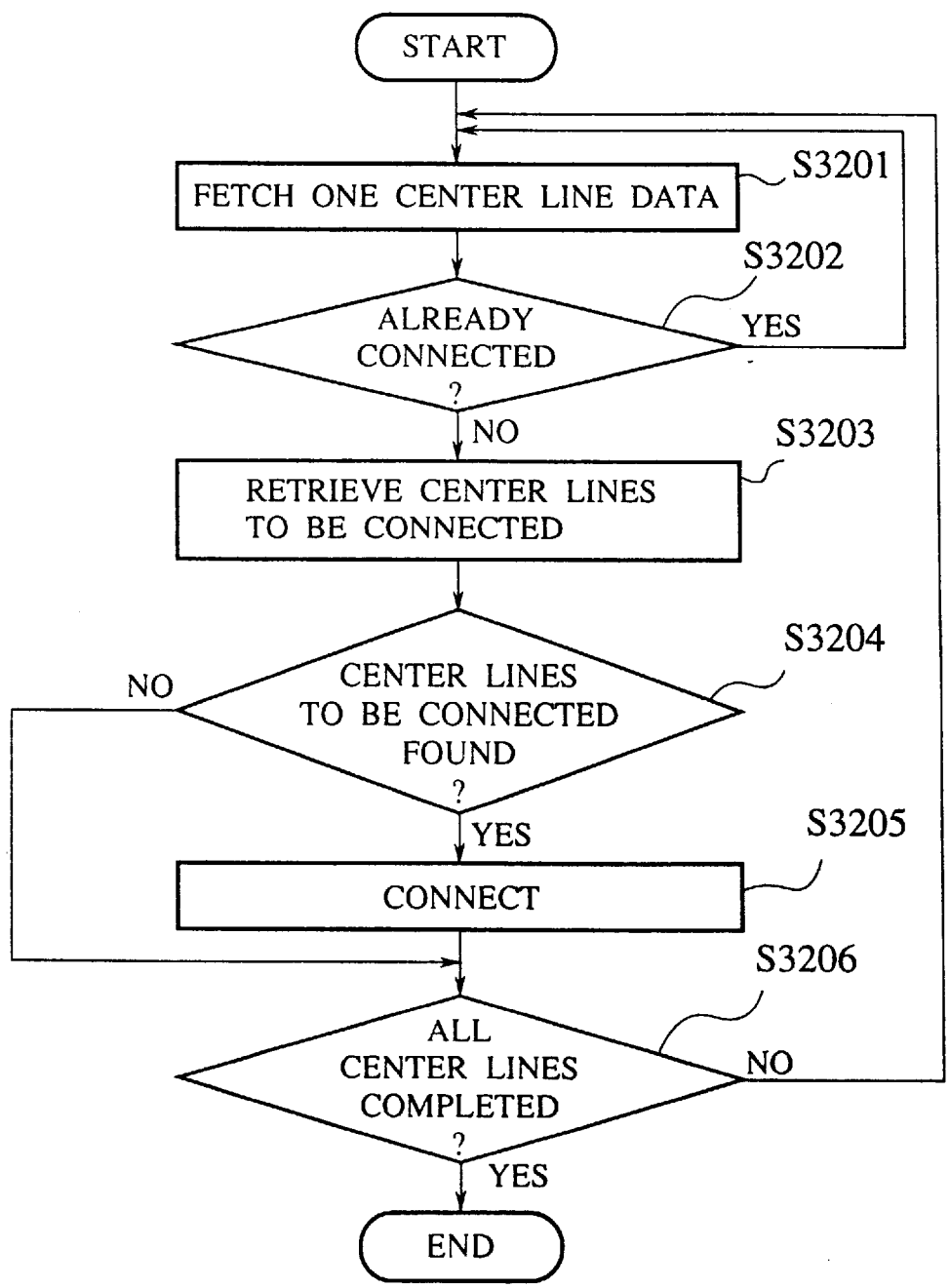
FIG. 32 is a flowchart illustrating process procedure in an processing portion in FIG. 23 for connecting center lines at intersecting points of prolonged lines of the center lines.
Figure 33A:
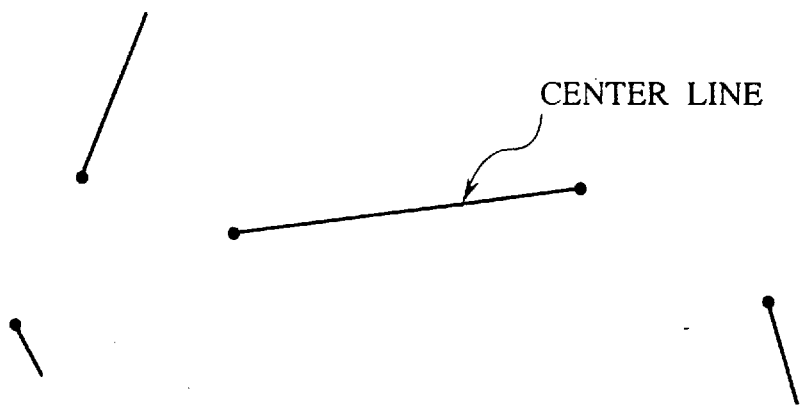
FIGS. 33A and 33B are views illustrative of process in the processing portion in FIG. 32.
Figure 33B:
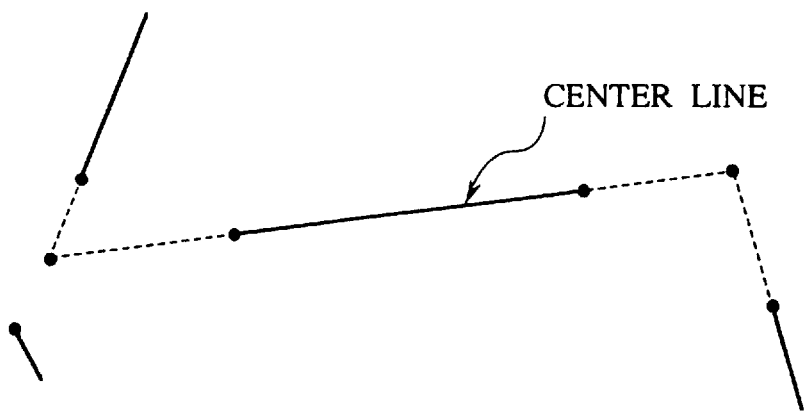

FIG. 32 is a flowchart illustrating process procedure in the processing portion 360 for connecting center lines at intersecting points of prolonged lines of the center lines. FIGS. 33A and 33B are views illustrative of process in the processing portion 360. First, center line data is fetched (step 3201). It is determined whether or not both extreme points of the center line have already connected (step 3202). The process returns to step 3201 to fetch next center line if both extreme points have already connected, whereas other center lines to be connected are retrieved if both extreme points have not connected yet (step 3203). Conditions for connecting extreme points are that, for example, a distance between the intersecting point and respective center line is less than a predetermined distance, an intersecting angle between the center lines is close to parallel (is more than a predetermined angle), and connected center lines do not intersect with the road margin segment. In turn, it is determined whether or not there exist center lines to be connected (step 3204). If yes, process for connecting them is effected (step 3205). More particularly, by way of example, both center lines are actually prolonged and are registered, and intersecting point is marked as "already connected". In case plural center lines to be connected are retrieved relative to each extreme point, a center line which most corresponds to the conditions should be selected. On the contrary, no center lines to be connected exists, then the process advances directly to step 3206. In step 3206, it is determined whether or not check of all center lines has been completed. If no, the process then returns to step 3201 while, if yes, a series of processes are ended.

Figure 34:
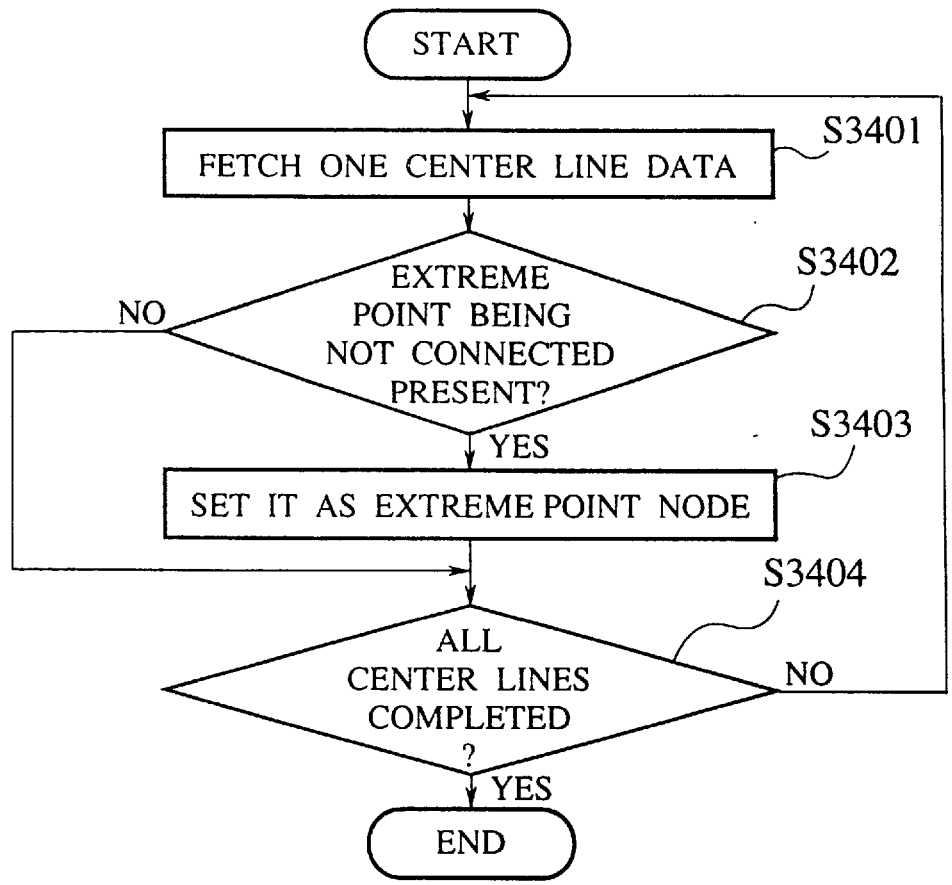
FIG. 34 is a flowchart illustrating process procedure in an processing portion in FIG. 23 for calculating extreme point nodes.

FIG. 34 is a flowchart illustrating process procedure in the processing portion 370 for calculating extreme point nodes.

Figure 35:
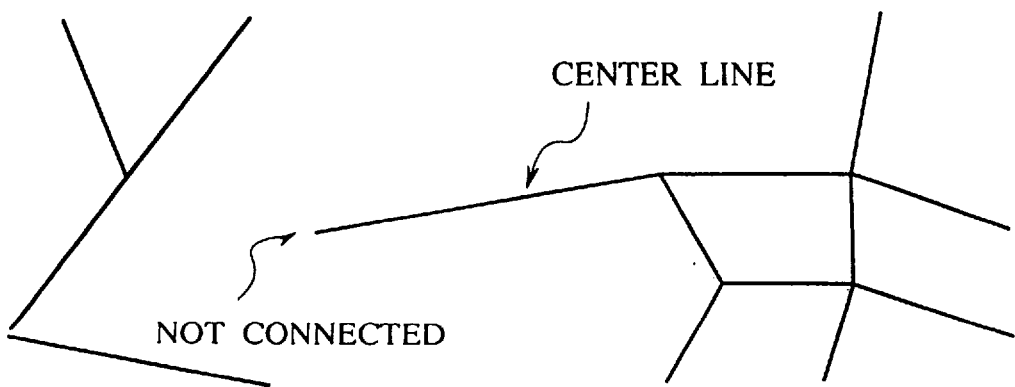
FIG. 35 is a view illustrative of process in the processing portion in FIG. 34.

FIG. 35 is a view illustrative of process in the processing portion 370. First, center line data is fetched (step 3401). It is determined whether or not there is the extreme point being not connected (step 3402). In case there is the extreme point being not connected, the extreme point is registered as extreme point node in a predetermined file (step 3403). Conversely, in case there is no extreme point being not connected, the process then proceeds directly to step 3404. In step 3404, it is determined whether or not all center lines have been checked. If no, the process then returns to step 3401 while, if yes, a series of processes are terminated.

With the above, precise center lines, i.e., precise road network information can be derived from road margin figures based on rough road network information according to the first configuration. Further, the center lines can be derived from narrow road margin information in road margin figures according to the second configuration. That is, precise and detailed road network information can be derived. Furthermore, finished center lines can be derived according to the third configuration. That is, precise, detailed and finished road network information can be derived.

In detail, it is possible to derive center lines and road widths automatically in the high-precision map by referring road network information which is low in precision but may be input at a low cost. Consequently, such a remarkable advantage may be achieved that an input cost of the map can be extremely reduced.

In addition, the large-scale map having road network information in extremely high precision can be prepared. As a result, such map can be used in service in which detailed location measurement and correction are requested. In addition, the map can also be utilized as detailed map information to determine whether or not a large-sized vehicle such as fire truck may pass through the road.

In addition, the administrative numbers of road network information are included in prepared detailed map. Hence, detailed map database including information which are to be retrieved from the administrative numbers of teaching road network information can be obtained. As a result, map database which includes detailed and high information and has extremely great usefulness can be constructed.

In other words, precise, detailed and finished database can be prepared and map information database including road network information and having extremely high utility value can be constructed, and therefore great advantage can be attained in effective utility of the map.

It should be understood that many modifications and adaptations of the invention will become apparent to those skilled in the art and it is intended to encompass such obvious modifications and changes in the scope of the claims appended hereto.

What is claimed is:

1. A method of automatically generating road network information, comprising the steps of:
    a) extracting center lines relative to large-scale road margin information with employing small-scale road network information as teaching information;
    b) extracting center lines relative to road margin information from which center lines have not extracted yet, based on road margin information from which center lines have already been extracted; and
    c) interpolating center lines obtained in steps a) and b), wherein said step a) comprises the steps of:
        a1) converting said small-scale road network information and said large-scale road margin information on a same coordinate system;

a3) extracting sequentially center lines from concerned road segments in said large-scale road margin information relative to all road segments by selecting road segments from said small-scale road network information one by one; and a4) passing information attached to said road network information as information attached to said center lines.

2. A method of automatically generating road network information according to claim 1, further comprising a step of a2) storing administrative number and attribute information of respective segments constituting said small scale road network information and said large-scale road margin information after said step a1).

3. A method of automatically generating road network information according to claim 1, wherein an administrative number and derived attribute information are stored every time when segment being as process object is processed in said step a3) and said step a4).

4. A method of automatically generating road network information according to claim 1, wherein said step a3) comprises the steps of:

a31) extracting, relative to said selected road segment, all road margin segments which are within a predetermined distance from said selected road segment and has more than predetermined parallelism to said selected road segment, from road margin segments in said road margin information, a32) extracting intersecting points between horizontal or vertical scanning lines and all road margin segments extracted in said step a31) and setting respective middle points between a plurality of extracted intersecting points as road central point candidates, a33) generating center line candidates by connecting road central point candidates being set in said step a32), and a34) selecting a candidate which has most similar length, distance, and road width to those of said selected road segment from said center line candidates generated in said step a33), and determining the selected candidate as a center line relative to said selected road segment.

5. A method of automatically generating road network information according to claim 4, wherein, in said step a32), administrative numbers and attribute information of two referred road margin segments, road widths relating to these road margin segments, and administrative numbers of road segments in concerned road network information are affixed to respective road central point candidates.

6. A method of automatically generating road network information according to claim 4, wherein, in said step a33), respective central point candidates are numbered in the order of array of said scanning lines and road central candidates on the same scanning lines are sequentially numbered, and center line candidates are generated by connecting said road central point candidates, under conditions that said road margin segments on both sides which are used to extract said road central point candidates are identical, distances between said road central point candidates are within a predetermined distance, variation in road widths in excess of a predetermined value is not caused between adjacent road central point candidates, and a bending angle of each center line is less than a predetermined value.

7. A method of automatically generating road network information according to claim 4, wherein, in said step a34), such a candidate is selected from center line candidates as a center line that a length is close to that of said road segment, a distance away from said road segment is short, and a road width is close to that of said road segment.

8. A method of automatically generating road network information, comprising the steps of:

a) extracting center lines relative to large-scale road margin information with employing small-scale road network information as teaching information;

b) extracting center lines relative to road margin information from which center lines have not extracted yet, based on road margin information from which center lines have already been extracted; and c) interpolating center lines obtained in steps a) and b), wherein said step b) comprises the steps of:

b1) recognizing road plane side relative to road margin information from which a center line is extracted, based on information of said center line, b2) recognizing road plane side relative to road margin information whose road plane is not defined, based on road margin information whose road plane side is defined in said step b1), b3) recognizing paired road margin segments constituting road plane from road margin information of which road plane sides are newly defined in said step b2), and b4) extracting a center line based on paired road margin segment defined in said step b3).

9. A method of automatically generating road network information according to claim 8, wherein, in said step b1) road margin information and center line information are received respectively from a road margin information storing means in which all said road margin information are stored and a center line information storing means in which center line information arc stored, and road margin information in which center lines are extracted are generated by correlating said road margin information with said center line information.

10. A method of automatically generating road network information according to claim 8, wherein said step b2) comprises the steps of:

b21) extracting road margin information whose road plane has not defined, and b22) recognizing road plane side relative to extracted road margin information whose road plane has not defined.

11. A method of automatically generating road network information according to claim 10, wherein, in said step b21), road margin information whose road plane has not defined and which is adjacent to said road margin information whose road plane has been defined is extracted.

12. A method of automatically generating road network information according to claim 10, wherein, in said step b21), road margin information whose road plane has not def ined and which exists continuously near said road margin information whose road plane has been defined is extracted.

13. A method of automatically generating road network information according to claim 10, wherein, in said step b22), when road plane side is to be recognized relative to road margin information whose road plane has not defined, a connecting direction of road margin information whose road plane has not been def iced is so defined that road plane side thereof is on the same side as that of road margin information whose road plane has been defined.

14. A method of automatically generating road network information according to claim 8, wherein, in said step b4), entire center line information is generated by adding newly generated center line information to already generated center line information.

15. A method of automatically generating road network information according to claim 8, wherein, in said step b4), said center line is extracted by connecting middle points of extreme points on both ends in overlap portion of paired road margin segments recognized in said step b3).

16. A method of automatically generating road network information, comprising the steps of:
   a) extracting center lines relative to large-scale road margin information with employing small-scale road network information as teaching information;
   b) extracting center lines relative to road margin information from which center lines have not extracted yet, based on road margin information from which center lines have already been extracted; and
   c) interpolating center lines obtained in steps a) and b), wherein said step c) comprises the steps of:
      c1) determining an extreme point of said center line extracted by up to said step b) as a dead end,
      c2) connecting extreme points of two center lines by segment
      c3) extracting intersecting points of center lines intersected,
      c4) connecting a center line intersecting with prolonged line of another center line to a prolonged center line,
      c5) connecting center lines at an intersecting point of prolonged lines of two center lines, and
      c6) extracting extreme point nodes from all center line information.

17. A system for automatically generating road network information, comprising:
   precise center line information generating means for extracting center lines relative to large-scale road margin information with employing small-scale road network information as teaching information;
   detailed center line information generating means for extracting center lines relative to road margin information whose center lines have not been extracted, based on road margin information whose center lines have been extracted; and
   finished center line information generating means for interpolating said center lines extracted by said detailed center line information generating means,
   wherein said precise center line information generating means comprises,
      coordinate transforming means for transforming said small-scale road network information and said large-scale road margin information to have the same coordinate system,
      concerned center line extracting means for carrying out such processes relative to all road segments that road segments are selected from said small-scale road network information one by one and then center lines are extracted relative to said large-scale road margin information corresponding to said road segments, and
      supplementary information succeeding means for succeeding to information affixed to said road network information as information affixed to said center lines.

18. A system for automatically generating road network information according to claim 17, further comprising storing means for storing administrative number and attribute information relative to respective segments constituting said small-scale road network information and said large-scale road margin information.

19. A system for automatically generating road network information according to claim 17, wherein administrative number and attribute information are stored every time when segments being subjected to process are processed in said concerned center line extracting means and said supplementary information succeeding means.

20. A system for automatically generating road network information according to claim 17, wherein said concerned center line extracting means comprises,
   segment calculating means for calculating, relative to said selected road segment, all road margin segments which are within a predetermined distance from said selected road segments and have more than predetermined parallelism to said selected road segments, from road margin segments in said road margin information,
   central point candidate extracting means for extracting intersecting points between horizontal or vertical scanning lines and said all road margin segments calculated by said segment calculating means, and setting respective middle points between a plurality of extracted intersecting points as road central point candidates,
   center line candidate generating means for generating center line candidates by connecting said road central point candidates set by said central point candidate extracting means, and
   center line determining means for selecting a candidate whose length, distance, and road width are most similar to those of said selected road segments from center line candidates generated by said center line candidate generating means, and determining the selected candidate as a center line with respect to said selected road segment.

21. A system for automatically generating road network information according to claim 20, wherein, in said central point candidate extracting means, administrative numbers and attribute information of two referred road margin segments, road widths relating to said two referred road margin segments, and administrative numbers of road segments in concerned road network information are affixed to respective road central point candidates.

22. A system for automatically generating road network information according to claim 20, wherein, in said center line candidate generating means,
   respective central point candidates are numbered in the order of array of said scanning lines and road central candidates on the same scanning lines are sequentially numbered, and
   center line candidates are generated by connecting said road central point candidates, under conditions that said road margin segments on both sides which are used to extract said road central point candidates are identical, distances between said road central point candidates are within a predetermined distance, variation in road widths in excess of a predetermined value is not caused between adjacent road central point candidates, and a bending angle of each center line is less than a predetermined value.

23. A system for automatically generating road network information according to claim 20, wherein said center line determining means selects such a candidate from center line candidates as a center line that a length is close to that of said road segment, a distance away from said road segment is short, and a road width is close to that of said road segment.

24. A system for automatically generating road network information, comprising:
   precise center line information generating means for extracting center lines relative to large-scale road margin information with employing small-scale road network information as teaching information;

detailed center line information generating means for extracting center lines relative to road margin information whose center lines have not been extracted, based on road margin information whose center lines have been extracted; and finished center line information generating means for interpolating said center lines extracted by said detailed center line information generating means, wherein said detailed center line information generating means comprises, road plane recognition processing means for recognizing road plane side relative to road margin information from which a center line is extracted, based on information of said center line, unrecognized road margin information road plane recognizing means for recognizing road plane side relative to road margin information whose road plane is not defined, based on road margin information whose road plane side is defined in said road plane recognition processing means, paired road margin segment recognition processing means for recognizing paired road margin segments constituting road plane from road margin information of which road plane sides are newly defined in said unrecognized road margin information road plane recognizing means, and center line extracting means for extracting a center line based on paired road margin segment defined in said paired road margin segment recognition processing means.

25. A system for automatically generating road network information according to claim 26, wherein said road plane recognition processing means receives respectively road margin information and center line information from a road margin information storing means in which all road margin information are stored and a center line information storing means in which center line information are stored, and generates road margin information in which center lines are extracted by correlating said road margin information with said center line information.

26. A system for automatically generating road network information according to claim 26, wherein said unrecognized road margin information road plane recognizing means comprises, unrecognized road margin information extracting means for extracting road margin information whose road plane has not defined, and road plane recognizing means for recognizing road plane side relative to extracted road margin information whose road plane has not defined.

27. A system for automatically generating road network information according to claim 26, wherein said unrecognized road margin information extracting means extracts road margin information whose road plane has not defined and which is adjacent to said road margin information whose road plane has been defined.

28. A system for automatically generating road network information according to claim 26, wherein said unrecognized road margin information extracting means extracts road margin information whose road plane has not defined and which exists continuously near said road margin information whose road plane has been defined.

29. A system for automatically generating road network information according to claim 26, wherein said road plane recognizing means defines a connecting direction of road margin information whose road plane has not been defined such that road plane side thereof is on the same side as that of road margin information whose road plane has been defined, when road plane side is to be recognized relative to road margin information whose road plane has not defined.

30. A system for automatically generating road network information according to claim 24, wherein said center line extracting means generates entire center line information by adding newly generated center line information to already generated center line information.

31. A system for automatically generating road network information according to claim 24, wherein said center line extracting means extracts said center line by connecting middle points of extreme points on both ends in overlap portion of paired road margin segments recognized in said paired road margin segment recognition processing means.

32. A system for automatically generating road network information , comprising:

precise center line information generating means for extracting center lines relative to large-scale road margin information with employing small-scale road network information as teaching information;

detailed center line information generating means for extracting center lines relative to road margin information whose center lines have not been extracted, based on road margin information whose center lines have been extracted; and finished center line information generating means for interpolating said center lines extracted by said detailed center line information generating means, wherein said finished center line information generating means comprises, means for determining an extreme point of said center line extracted by said detailed center line information generating means as a dead end, means for connecting extreme points of two center lines by segments, means for extracting intersecting points of center lines intersected, means for connecting a center line intersecting with prolonged line of another center line to a prolonged center line, means for connecting center lines at an intersecting point of prolonged lines of two center lines, and means for extracting extreme point nodes from all center line information.

33. A method of automatically generating road network information, comprising the steps of:

a1) converting small-scale road network information and large-scale road margin information on a same coordinate system;

a3) extracting sequentially center lines from concerned road segments in said large-scale road margin information relative to all road segments by selecting road segments from said small-scale road network information one by one; and a4) passing information attached to said road network information as information attached to said center lines.

34. A method of automatically generating road network information according to claim 33, further comprising a step of a2) storing administrative number and attribute information of respective segments constituting said small scale road network information and said large-scale road margin information after said step a1.

35. A method of automatically generating road network information according to claim 33, wherein an administrative number and derived attribute information are stored every time when segment being as process object is processed in said step a3) and said step a4).

36. A method of automatically generating road network information according to claim 33, wherein said step a3) comprises the steps of:
- a31) extracting, relative to said selected road segment, all road margin segments which are within a predetermined distance from said selected road segment and has more than predetermined parallelism to said selected road segment, from road margin segments in said road margin information,
- a32) extracting intersecting points between horizontal or vertical scanning lines and said all road margin segments extracted in said step a31), and setting respective middle points between a plurality of extracted intersecting points as road central point candidates,
- a33) generating center line candidates by connecting road central point candidates being set in said step a32), and
- a34) selecting a candidate which has most similar length, distance, and road width to those of said selected road segment from said center line candidates generated in said step a33), and determining the selected candidate as a center line relative to said selected road segment.

37. A system for automatically generating road network information, comprising:
- coordinate transforming means for transforming a small-scale road network information and a large-scale road margin information to have the same coordinate system,
- concerned center line extracting means for carrying out such processes relative to all road segments that road segments are selected from said small-scale road network information one by one and then center lines are extracted relative to said large-scale road margin information corresponding to said road segments, and
- supplementary information succeeding means for succeeding to information affixed to said road network information as information affixed to said center lines.

38. A method of automatically generating road network information, comprising the steps of:
- b1) recognizing road plane side relative to road margin information from which a center line is extracted, based on information of said center line,
- b2) recognizing road plane side relative to road margin information whose road plane is not defined, based on road margin information whose road plane side is defined in said step b1),
- b3) recognizing paired road margin segments constituting road plane from road margin information of which road plane sides are newly defined in said step b2), and
- b4) extracting a center line based on paired road margin segment defined in said step b3).

39. A method of automatically generating road network information according to claim 38, wherein, in said step b1) road margin information and center line information are received respectively from a road margin information storing means in which all said road margin information are stored and a center line information storing means in which center line information are stored, and road margin information in which center lines are extracted are generated by correlating said road margin information with said center line information, and then road plane sides are recognized relative to road margin information having corresponding center line information.

40. A method of automatically generating road network information according to claim 38, wherein, in said step b1) said road margin information is displayed on displaying means, and an operator designates road plane side to said road margin information displayed on said displaying means via instructing means.

41. A method of automatically generating road network information according to claim 38, wherein said step b2) comprises the steps of:
- b21) extracting road margin information whose road plane has not defined, and
- b22) recognizing road plane side relative to extracted road margin information whose road plane has not defined.

42. A method of automatically generating road network information according to claim 38, wherein, in said step b4) entire center line information is generated by adding newly generated center line information to already generated center line information.

43. A method of automatically generating road network information according to claims 38, wherein, in said step b4), said center line is extracted by connecting middle points of extreme points on both ends in overlap portion of paired road margin segments recognized in said step b3).

44. A system for automatically generating road network information, comprising:
- road plane recognition processing means for recognizing road plane side relative to road margin information from which a center line is extracted, based on information of said center line,
- unrecognized road margin information road plane recognizing means for recognizing road plane side relative to road margin information whose road plane is not defined, based on road margin information whose road plane side is defined in said road plane recognition processing means,
- paired road margin segment recognition processing means for recognizing paired road margin segments constituting road plane from road margin information of which road plane sides are newly defined in said unrecognized road margin information road plane recognizing means, and
- center line extracting means for extracting a center line based on paired road margin segment defined in said paired road margin segment recognition processing means.

* * * * *